United States Patent
Teramoto

(10) Patent No.: US 12,007,776 B2
(45) Date of Patent: Jun. 11, 2024

(54) AUTONOMOUS TRAVELING SYSTEM, AUTONOMOUS TRAVELING METHOD, AND AUTONOMOUS TRAVELING PROGRAM STORED ON COMPUTER-READABLE STORAGE MEDIUM

(71) Applicant: OMRON Corporation, Kyoto (JP)

(72) Inventor: Eiji Teramoto, Kusatsu (JP)

(73) Assignee: OMRON Corporation, Kyoto (JP)

( * ) Notice: Subject to any disclaimer, the term of this patent is extended or adjusted under 35 U.S.C. 154(b) by 77 days.

(21) Appl. No.: 16/953,734

(22) Filed: Nov. 20, 2020

(65) Prior Publication Data
US 2021/0173403 A1    Jun. 10, 2021

(30) Foreign Application Priority Data

Dec. 5, 2019    (JP) .................................. 2019-220184

(51) Int. Cl.
*G05D 1/02* (2020.01)
*G05D 1/00* (2006.01)

(52) U.S. Cl.
CPC ... *G05D 1/0221* (2013.01); *G05D 2201/0203* (2013.01)

(58) Field of Classification Search
CPC ......... G05D 1/0221; G05D 2201/0203; G05D 1/0219; G05D 1/0274; G05D 1/0212; G05D 2201/0215; G01C 21/00
See application file for complete search history.

(56) References Cited

U.S. PATENT DOCUMENTS 11,191,412 B2 * 12/2021 Lamon ................. G05D 1/0219
2005/0027399 A1    2/2005 Koh et al.
(Continued)

FOREIGN PATENT DOCUMENTS

CN    1028699553 A    1/2013
CN    110477824 A    11/2019
(Continued)

OTHER PUBLICATIONS

Kawai Taiji, et al.; Autonomous Travel Device and Start Position Determination Program (Machine Translation of JP-2017182175-A) (Year: 2017).*
(Continued)

*Primary Examiner* — Anne Marie Antonucci
*Assistant Examiner* — Patrick Daniel Mohl
(74) *Attorney, Agent, or Firm* — METROLEX IP LAW GROUP, PLLC

(57) ABSTRACT

A cleaner according one or more embodiments may include a reception unit that receives a teaching operation performed by an operator. A cleaner may further include a registration unit that registers, with a storage, an individual traveling route corresponding to the teaching operation, an obtaining unit that obtains, from a plurality of the individual traveling routes registered with the storage, a plurality of individual traveling routes selected by the operator, a setting unit that sets an order of the obtained plurality of individual traveling routes, and a generation unit that generates the traveling route based on the obtained plurality of individual traveling routes and the set order of the plurality of individual traveling routes.

20 Claims, 17 Drawing Sheets

(56) References Cited

U.S. PATENT DOCUMENTS

| | | | |
|---|---|---|---|
| 2005/0075785 A1* | 4/2005 | Gray | A01B 69/008 |
| | | | 701/410 |
| 2009/0326713 A1 | 12/2009 | Moriya | |
| 2011/0288667 A1 | 11/2011 | Noda et al. | |
| 2013/0103311 A1 | 4/2013 | Yanase | |
| 2017/0102702 A1* | 4/2017 | Ishijima | G05D 1/0219 |
| 2017/0122742 A1* | 5/2017 | Schleicher | G05D 1/0212 |
| 2019/0145058 A1* | 5/2019 | Fritz | G05D 1/0214 |
| | | | 701/533 |
| 2019/0310090 A1* | 10/2019 | Huang | G01C 21/20 |
| 2019/0346853 A1* | 11/2019 | Gabrecht | G05D 1/0225 |

FOREIGN PATENT DOCUMENTS

| | | |
|---|---|---|
| CN | 110941261 A | 3/2020 |
| CN | 110941261 B | 2/2021 |
| JP | H7-104846 A | 4/1995 |
| JP | 2007-226322 A | 9/2007 |
| JP | 2017-130083 A | 7/2017 |
| JP | 2017-182175 A | 10/2017 |
| JP | 2021-15341 A | 2/2021 |
| WO | 2021/106331 A1 | 6/2021 |

OTHER PUBLICATIONS

Extended European search report (EESR) dated Mar. 15, 2021 in a counterpart European patent application.
Office Action (JPOA) dated Jan. 11, 2022 in a counterpart Japanese patent application.
Communication dated Mar. 18, 2022 in a counterpart European patent application.
Office Action issued on Sep. 11, 2023 in a counterpart Chinese patent application.
Office Action issued on Mar. 20, 2024 in a counterpart Chinese patent application.

* cited by examiner

| Route ID | Route name | Position information | Route image |
|---|---|---|---|
| 0001 | R1 | P1 | E1 |
| 0002 | R2 | P2 | E2 |
| 0003 | R3 | P3 | E3 |
| 0004 | R4 | P4 | E4 |
| 0005 | R5 | P5 | E5 |
| ⋮ | ⋮ | ⋮ | ⋮ |

AUTONOMOUS TRAVELING SYSTEM, AUTONOMOUS TRAVELING METHOD, AND AUTONOMOUS TRAVELING PROGRAM STORED ON COMPUTER-READABLE STORAGE MEDIUM

CROSS-REFERENCE TO RELATED APPLICATION

The present application claims priority to Japanese Patent Application No. 2019-220184 filed with Japan Patent Office on Dec. 5, 2019, the contents of which are incorporated herein by reference.

BACKGROUND

The disclosure relates to an autonomous traveling system, an autonomous traveling method, and an autonomous traveling program for causing an autonomous traveling device to travel autonomously.

Recent labor shortages and increasing labor costs have caused a shortage of cleaning personnel who clean wide places, such as concourses at stations or airports and shopping malls. The labor shortages and other factors have increased the use of industrial autonomous traveling cleaning robots (autonomous traveling devices) with high cleaning performance and a high degree of safety.

Some autonomous traveling devices may teach the traveling route (teaching function) based on an operation performed by an operator (refer to, for example, Japanese Unexamined Patent Application Publication No. 2017-182175 (Patent Literature 1)). For example, an operator may set an autonomous traveling device in a route teaching mode, and may drive the autonomous traveling device within a work area to cause the autonomous traveling device to travel on an intended route while recording the traveled route (path). The autonomous traveling device set in an autonomous traveling mode again travels the traveling route recorded in the route teaching mode. The above described arrangement enables the autonomous traveling device to travel autonomously on the traveling route generated based on the operation performed by the operator (teaching operation).

SUMMARY

However, to correct a part of the taught traveling route of such a known autonomous traveling device, or for example, to correct a part of the route between the starting point and the end point of the taught route, the operator may again drive the autonomous traveling device from the starting point to the end point of the taught route to re-record the entire traveling route. The repeating of the operator interaction to correct all or a part of the route lowers the work efficiency of the operator for generating the traveling route of the autonomous traveling device.

One or more embodiments may be directed to an autonomous driving system, an autonomous driving method, and an autonomous traveling program for improving the work efficiency of an operator for generating a traveling route of an autonomous traveling device.

An autonomous traveling system according to one or more embodiments may be an autonomous traveling system for causing an autonomous traveling device to travel based on a traveling route. The autonomous traveling system may include a reception unit that receives a teaching operation performed by an operator to cause a teaching travel of the autonomous traveling device, a registration unit that registers, with a storage, an individual traveling route corresponding to the teaching operation received by the reception unit, an obtaining unit that obtains, from a plurality of the individual traveling routes registered with the storage, a plurality of individual traveling routes selected by the operator, a setting unit that sets an order of the plurality of individual traveling routes obtained by the obtaining unit, and a generation unit that generates the traveling route based on the plurality of individual traveling routes obtained by the obtaining unit and the order of the plurality of individual traveling routes set by the setting unit.

In the above-described structure, the traveling route in a work area is divided into a plurality of individual traveling routes, which are then registered with the storage. Thus, an intended traveling route may be generated easily by connecting a plurality of individual traveling routes selected by the operator. To partly change the generated traveling route, an individual traveling route corresponding to a part to be changed is replaced with a newly generated individual traveling route. The generated traveling route may be changed partly, without generating an entirely new traveling route, which improves the work efficiency of the operator for generating the traveling route of the autonomous traveling device.

In the autonomous traveling system, the registration unit may register, as the individual traveling route with the storage, a route on which the autonomous traveling device travels during a period from when the reception unit receives an instruction to start the teaching operation to when the reception unit receives an instruction to end the teaching operation. In the autonomous traveling system, the registration unit may register, with the storage, the individual traveling route for each teaching operation.

Thus, a plurality of individual traveling routes each generated for the teaching operation are registered with the storage.

The autonomous traveling system may further include a display unit that displays, on a display, the plurality of individual traveling routes registered with the storage. The obtaining unit may obtain a plurality of individual traveling routes selected by the operator from the plurality of individual traveling routes displayed on the display.

The operator may thus obtain a plurality of individual traveling routes included in an intended traveling route.

In the autonomous traveling system, the setting unit may set an order of selection in which the operator selects the plurality of individual traveling routes as the order of the plurality of individual traveling routes.

In the autonomous traveling system, the generation unit may generate the traveling route by connecting the plurality of individual traveling routes obtained by the obtaining unit in the order set by the setting unit.

The operator may thus generate a traveling route with an intended route.

In the autonomous traveling system, when two of the individual traveling routes that are in a consecutive order have different connecting positions, the generation unit may generate a supplemental route connecting the connecting positions and generate the traveling route with the plurality of individual traveling routes and the supplemental route.

The generation of a supplemental route, for example, eliminates a teaching operation for connecting two of the individual traveling routes to be performed by the operator.

The autonomous traveling system may further include a display unit that displays, on a display, the traveling route generated by the generation unit. The display unit may display the supplemental route in the traveling route on the display in an identifiable manner.

The operator may thus easily identify the supplemental route included in the generated traveling route.

In the autonomous traveling system, the registration unit may register, with the storage, the traveling route generated by the generation unit.

The autonomous traveling system may further include a traveling unit that causes the autonomous traveling device to travel based on the traveling route generated by the generation unit. When two of the individual traveling routes that are in a consecutive order have different connecting positions, the traveling unit may cause the autonomous traveling device to travel on a supplemental route connecting the connecting positions based on connecting position information indicating the connecting positions and current position information and map information about the autonomous traveling device.

The operator may thus cause the autonomous traveling device to travel on an intended route when the plurality of individual traveling routes selected by the operator are distant from each other.

An autonomous traveling method according to one or more embodiments is an autonomous traveling method for causing an autonomous traveling device to travel based on a traveling route. The autonomous traveling method is implementable by one or more processors. The autonomous traveling method includes receiving a teaching operation performed by an operator to cause a teaching travel of the autonomous traveling device, registering, with a storage, an individual traveling route corresponding to the received teaching operation, obtaining, from a plurality of the individual traveling routes registered with the storage, a plurality of individual traveling routes selected by the operator, setting an order of the obtained plurality of individual traveling routes, and generating the traveling route based on the obtained plurality of individual traveling routes and the set order of the plurality of individual traveling routes.

An autonomous traveling program according to one or more embodiments is an autonomous traveling program for causing an autonomous traveling device to travel based on a traveling route. The autonomous traveling program causes one or more processors to perform operations including receiving a teaching operation performed by an operator to cause a teaching travel of the autonomous traveling device, registering, with a storage, an individual traveling route corresponding to the received teaching operation, obtaining, from a plurality of the individual traveling routes registered with the storage, a plurality of individual traveling routes selected by the operator, setting an order of the obtained plurality of individual traveling routes, and generating the traveling route based on the obtained plurality of individual traveling routes and the set order of the plurality of individual traveling routes.

The technique according to one or more embodiments may improve the work efficiency of an operator for generating the traveling route of the autonomous traveling device.

DETAILED DESCRIPTION

One or more embodiments are described with reference to the drawings. The one or more embodiments described herein are mere examples and should not be construed as limiting the technical scope of the invention.

Cleaner 10

Figure 1:
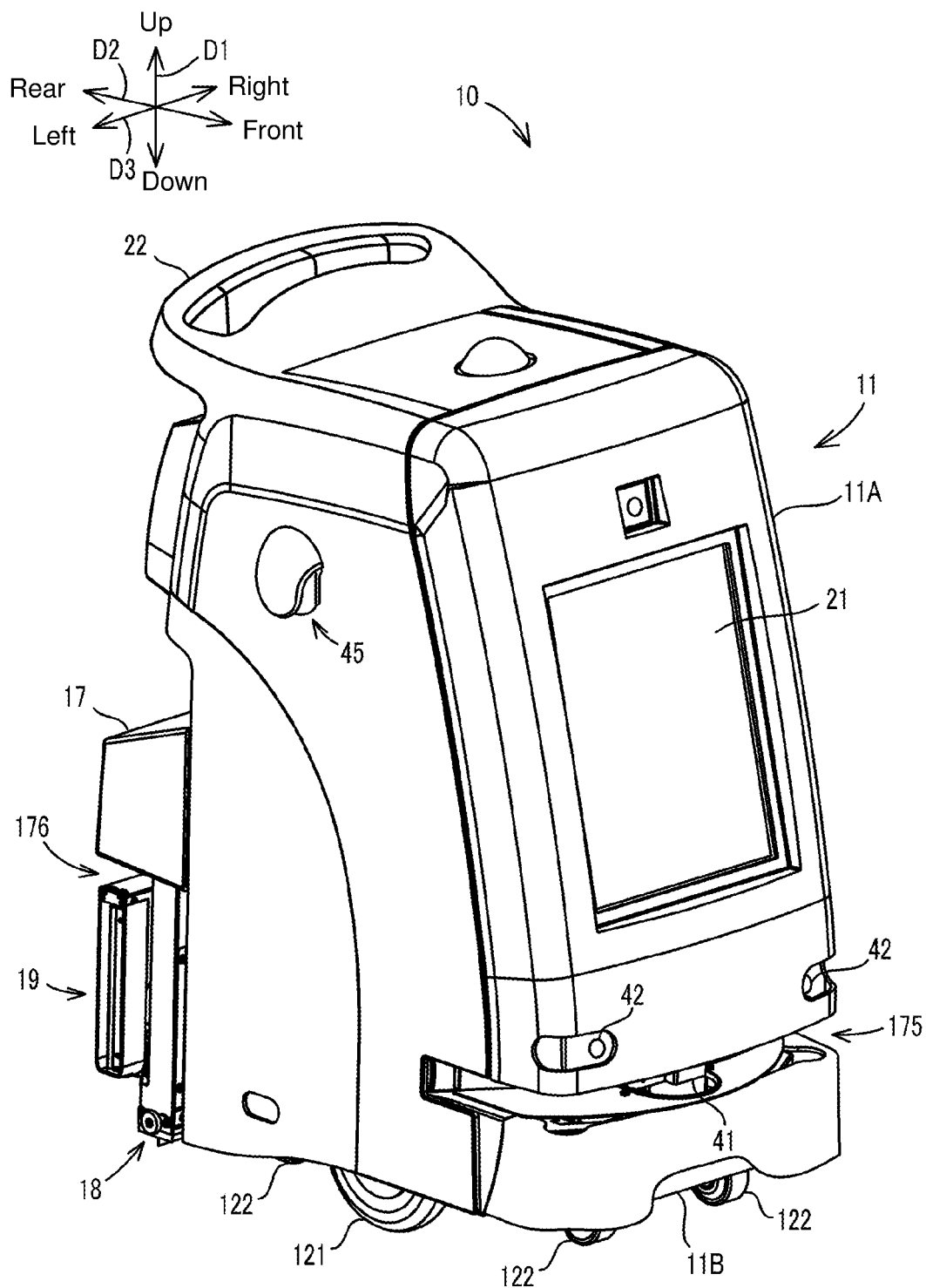
FIG. 1 is a diagram illustrating an external front perspective view of a cleaner according to one or more embodiments.
Figure 2:
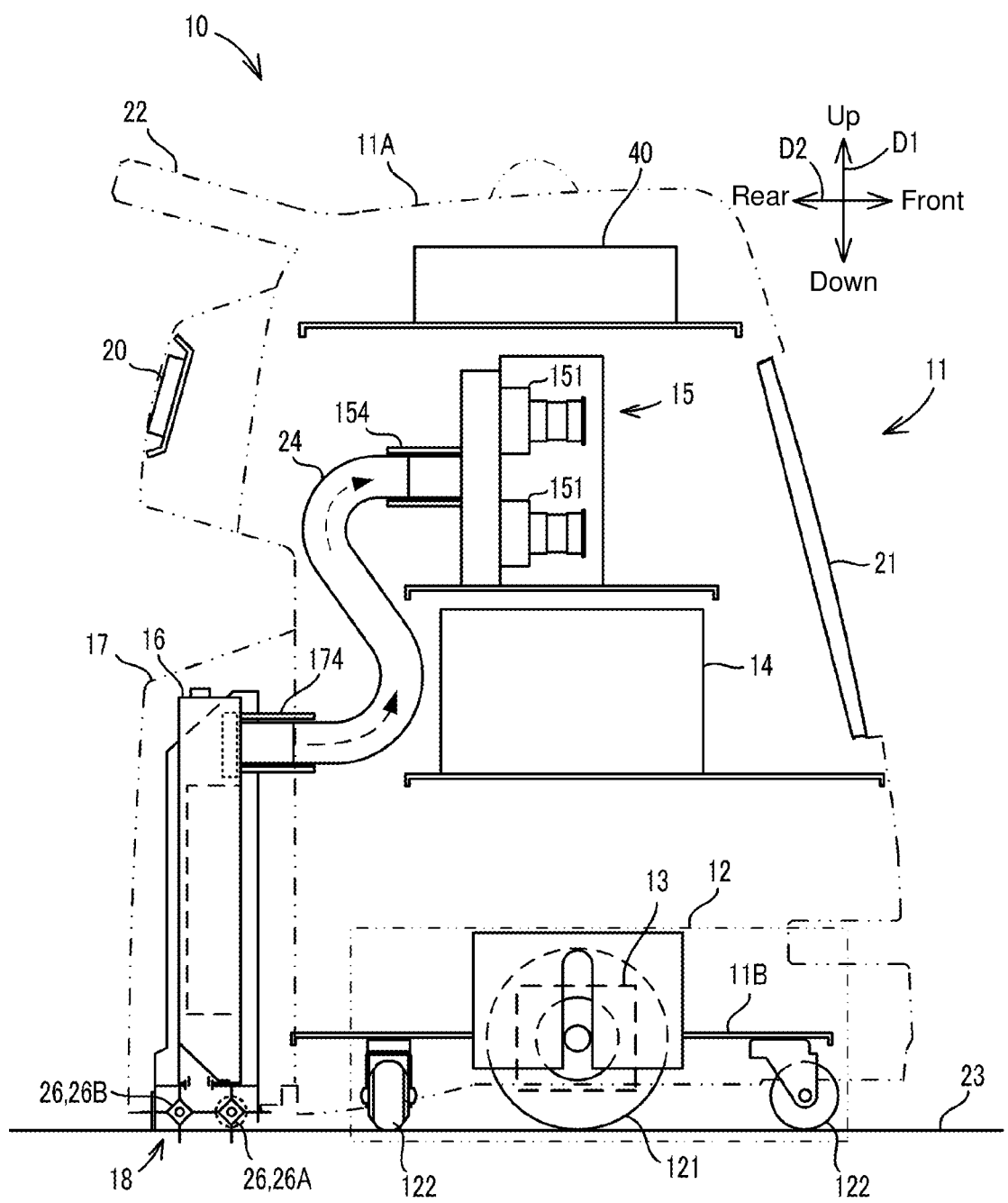
FIG. 2 is a schematic diagram illustrating a cleaner according to one or more embodiments.

FIG. 1 is a diagram illustrating an external front perspective view of an autonomous traveling cleaner 10 according to one or more embodiments. FIG. 2 is a schematic diagram illustrating the cleaner 10 showing its internal structure. A vertical direction D1, a front-rear direction D2, and a lateral direction D3 referred to herein are illustrated in the figures. The cleaner 10 is may be example of an autonomous traveling device in one or more embodiments.

The cleaner 10 is an autonomous traveling device that moves autonomously on a floor surface 23 (refer to FIG. 2) of a concourse at a facility such as an airport, a station, or a shopping mall. The cleaner 10 is also referred to as a mobile robot. While moving autonomously, the cleaner 10 sucks debris, such as dirt and dust, on the floor surface 23, separates the debris with a filter, and then collects the debris into a collection box 16 (refer to FIG. 2). The cleaner 10 automatically cleans the floor surface 23 while traveling on the floor surface 23 based on various items of information including traveling routes and cleaning areas that are preliminarily input, the time of day for cleaning, and the home position to which the cleaner 10 returns for charging.

The cleaner 10 is a mere example of the autonomous traveling device according to one or more embodiments. One or more embodiments may also be applicable to, for example, cleaners that clean indoor floor surfaces or outdoor surfaces, such as pedestrians and vehicle roads, while traveling autonomously. One or more embodiments may also be applicable to autonomous traveling robots for other uses, or for example, to autonomous traveling security robots, care robots, and load carrying robots.

As shown in FIG. 2, the cleaner 10 includes a body 11 and functional units included in the body 11. More specifically, the body 11 includes a traveling assembly 12, motors 13, a battery 14, a suction unit 15, the collection box 16, a support holder 17, a suction nozzle 18, an extension nozzle 19 (refer to FIG. 1), an operation unit 20, a display panel 21, a charging connector 30, and a control unit 40 (controller).

As shown in FIG. 1, the body 11 includes an exterior cover 11A defining the exterior of the body 11. As shown in FIG. 2, the body 11 includes a chassis 11B in its lower portion. The chassis 11B is located substantially parallel to the floor surface 23. The body 11 includes a support frame for supporting the above functional units as appropriate.

As shown in FIG. 2, the body 11 includes the traveling assembly 12 in its lower portion. The traveling assembly 12, which is attached to the chassis 11B, maintains the traveling posture of the body 11 and transmits the moving force of the body 11 in the traveling direction to the floor surface 23. The traveling assembly 12 includes a pair of traveling wheels 121 and four casters 122.

The wheels 121 are rotatably supported in the middle of the chassis 11B in the front-rear direction and at the two ends of the chassis 11B in the lateral (width) direction D3. The four casters 122 maintain the traveling posture of the body 11 and are rotatably supported at two front ends and two rear ends of the chassis 11B. When the cleaner 10 is located on the floor surface 23, the floor surface 23 supports the outer peripheral surfaces of the wheels 121 and the casters 122. The body 11 is thus maintained in the traveling posture shown in FIGS. 1 and 2.

Each wheel 121 includes a rotational shaft connected to an output shaft of the motor 13 through a transmission such as a reduction gear. When the motor 13 is driven to output a rotational driving force from the output shaft, the rotational driving force of the motor 13 is transmitted to the corresponding wheel 121. In one or more embodiments, the motor 13 is located separately for each of the pair of wheels 121. Thus, driving of each motor 13 is individually controlled to control the rotational speed of the corresponding wheel 121. When, for example, the rotational speed of each wheel 121 is controlled at the same speed, the cleaner 10 travels straight. When the rotational speed of each wheel 121 is controlled at a different speed, the floor cleaner 10 turns on the wheel 121 with a lower rotational speed.

The suction unit 15 is located above the battery 14 (described later) inside the body 11. The suction unit 15 generates a suction force for sucking air through the suction nozzle 18. The suction unit 15 includes multiple suction fans 151. The suction unit 15 has a suction port 154 that receives a flexible hose 24. The suction fans 151 are driven to draw air through an inlet at a distal end of the flexible hose 24. The air then passes through the flexible hose 24, the suction unit 15, and an exhaust duct (not shown), and is then discharged outside.

The battery 14 is located in a central portion of the body 11. The battery 14 supplies power for driving the motors 13 and the suction fans 151.

Figure 3:
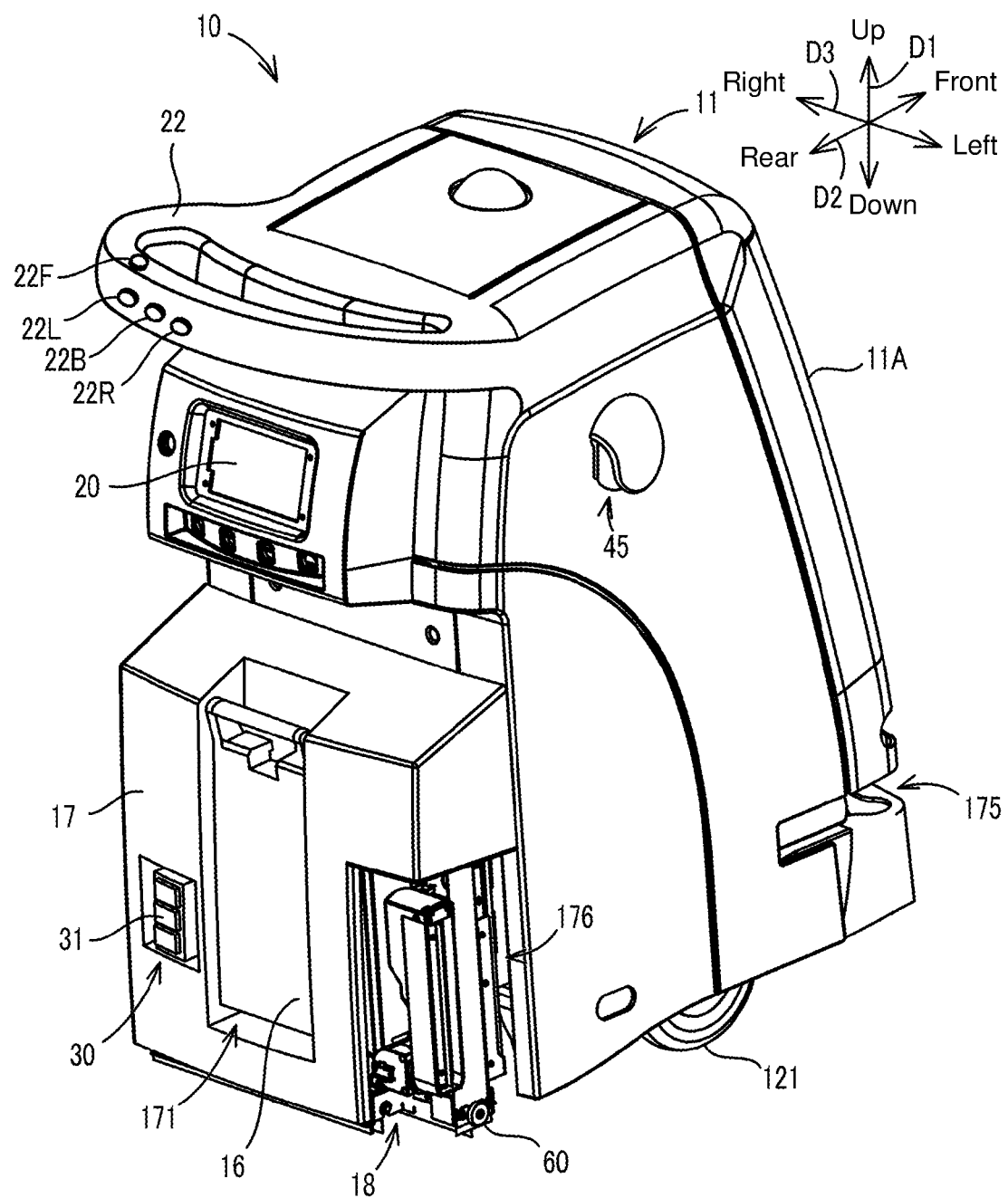
FIG. 3 is a diagram illustrating an external rear perspective view of a cleaner according to one or more embodiments.

FIG. 3 is a diagram illustrating an external rear perspective view of the cleaner 10. As shown in FIGS. 2 and 3, the collection box 16 is located on a back surface of the body 11. The body 11 includes, on its back surface, the support holder 17 covering the back surface and supporting the collection box 16 in a detachable manner. The support holder 17 has a recess 171 extending in the vertical direction D1 in its middle in the lateral (width) direction D3 and receiving the collection box 16 in a removable manner.

As shown in FIG. 2, the support holder 17 includes a suction port 174 that extends frontward from a bottom surface of the recess 171. The suction port 174 communicates with an outlet in an upper portion of the collection box 16. The suction port 174 receives the end of the flexible hose 24.

As shown in FIG. 3, the support holder 17 includes the suction nozzle 18 in its lower portion and the extension nozzle 19 in its side portion. The suction nozzle 18 includes a pair of rotary brushes 26 (26A and 26B) in a rotatable manner. The rotary brushes 26 rotate with a rotational driving force from a motor (not shown). The motor is driven by the control unit 40 during traveling of the cleaner 10 to rotate the rotary brushes 26, which collect debris on the floor surface 23 in a reliable manner. The support holder 17 includes the charging connector 30 used for charging the battery 14. The charging connector 30 includes three receiving terminals 31 connected to three feeding terminals included in a charging station.

As shown in FIG. 3, the extension nozzle 19 is located in a left portion of the support holder 17. The support holder 17 includes, on its left, a compartment 176 that may accommodate the extension nozzle 19. The extension nozzle 19 is supported by the support holder 17. More specifically, the extension nozzle 19 is supported by the support holder 17 in a manner switchable between a retracted posture (posture shown in FIGS. 1 and 3) of being retracted in the compartment 176 and a lateral cleaning posture (not shown) of being turned leftward from inside the compartment 176 to clean the floor surface 23 on the left of the body 11.

Figure 4:
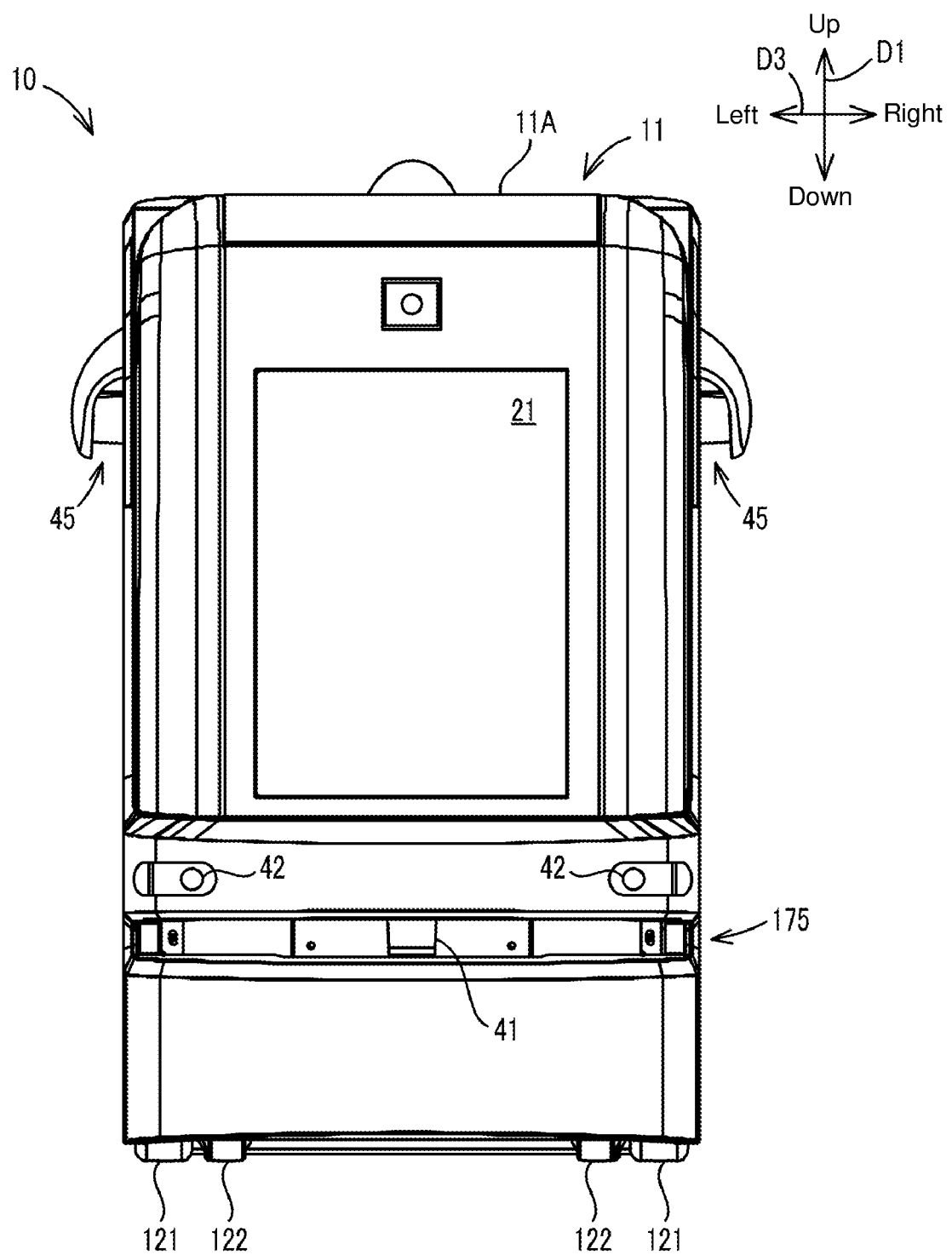
FIG. 4 is a diagram illustrating a front view of a cleaner according to one or more embodiments.

FIG. 4 is a diagram illustrating a front view of the cleaner 10. As shown in FIG. 4, the cleaner 10 includes a front laser sensor 41 and sonar sensors 42 on its front surface.

The front laser sensor 41 is received in a groove 175 extending in the width direction and located in a front lower portion of the body 11. The front laser sensor 41 is located at the center in the groove 175. The front laser sensor 41 includes a laser oscillator, a laser driver for driving the laser oscillator, a light receiver, and a light-receiving circuit for converting an output from the light receiver into a digital signal. The front laser sensor 41 is connected to and controlled by the control unit 40. The front laser sensor 41 scans an area in front of the cleaner 10 in the width (horizontal) direction with laser light emitted frontward within the range of a predetermined scan angle (e.g., 120°). In response to the front laser sensor 41 receiving laser light that returns after being reflected by an illuminated object (target), the control unit 40 measures the time taken for the laser light to return, and calculates a distance from each scanning position to the object based on the measurement value. Thus, the control unit 40 may determine the distance to an object in front of (in the traveling direction of) the cleaner 10 and the position of the object, as well as the shape and size of the object in the width direction.

The sonar sensors 42 are located below the display panel 21. The sonar sensors 42 are located at the two front ends of the body 11 in the width direction. The sonar sensors 42 are connected to and controlled by the control unit 40. The sonar sensors 42 detect an object with a sound wave and measure the distance to the object based on the time taken for the sound wave to be reflected by the object and return.

As shown in FIGS. 1 and 3, the body 11 includes side laser sensors 45 on its two side surfaces. Each side laser sensor 45 has substantially the same structure as the front laser sensor 41. Each side laser sensor 45 includes a laser oscillator, a laser driver for driving the laser oscillator, a light receiver, and a light-receiving circuit for converting an output from the light receiver into a digital signal. The side laser sensors 45 are connected to and controlled by the control unit 40. The side laser sensors 45 scan areas around the cleaner 10 with laser light emitted frontward, downward, and then rearward within the range of a predetermined scan angle (e.g., 180°). In response to the side laser sensors 45 receiving laser light that returns after being reflected by an illuminated object (target), the control unit 40 measures the time taken for the laser light to return, and calculates the distance from each scanning position to the object based on the measurement value. Thus, the control unit 40 may determine the distances to an object in front of (in the traveling direction of) the cleaner 10 and to a step and an obstacle on the floor surface 23 and their positions, as well as the shapes and sizes of the object, step, and obstacle in the scanning direction.

The operation unit 20 (refer to FIG. 3) is located on an upper back surface of the body 11. The operation unit 20 is attached to the exterior cover 11A. The operation unit 20 is operable by an operator, and is, for example, a device with a touchscreen operable by touch. The operation unit 20 displays an operation screen to allow the operator to perform operations (e.g., teaching, registration, setting, and travel instruction operations). Information about an operation performed on the operation unit 20 is transmitted to the control unit 40 and used for travel control performed by the control unit 40. The operation unit 20 may be located on an upper surface (top plate) of the body 11. The operation unit 20 may be an example of a display in one or more embodiments.

The display panel 21 (refer to FIG. 1) is located on a front surface of the body 11. The display panel 21 is, for example, a liquid crystal display panel. Various messages are displayed on the display panel 21 by the control unit 40 during cleaning. These messages include a cleaning status message indicating cleaning currently being performed or a guidance message about a floor currently being cleaned.

An operation handle 22 (refer to FIG. 3) is located at an uppermost end of the back surface of the body 11. The operation handle 22 is attached to the exterior cover 11A. The operation handle 22 is grippable by the operator manually driving the cleaner 10 to clean or perform a teaching operation for teaching a traveling route to the cleaner 10. As shown in FIG. 3, the operation handle 22 includes operation buttons (e.g., a travel button 22F, a retract button 22B, a left-turn button 22L, and a right-turn button 22R) that receive a driving operation performed by the operator. Information about an operation performed on the operation buttons is transmitted to the control unit 40 and used for travel control performed by the control unit 40.

A communicator 25 (refer to FIG. 5) is a communication interface that connects the cleaner 10 to a network with wires or wirelessly for data communication with an external device such as a server (not shown) through the network in accordance with a predetermined communication protocol.

Figure 5:
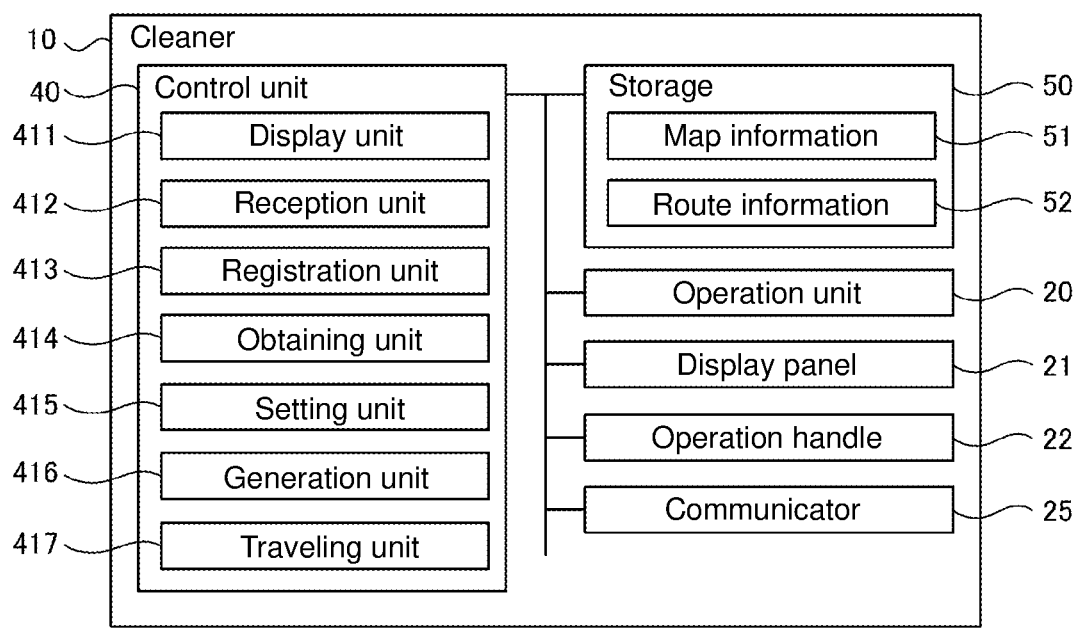
FIG. 5 is a functional block diagram illustrating aspects of a cleaner according to one or more embodiments.
Figure 6:
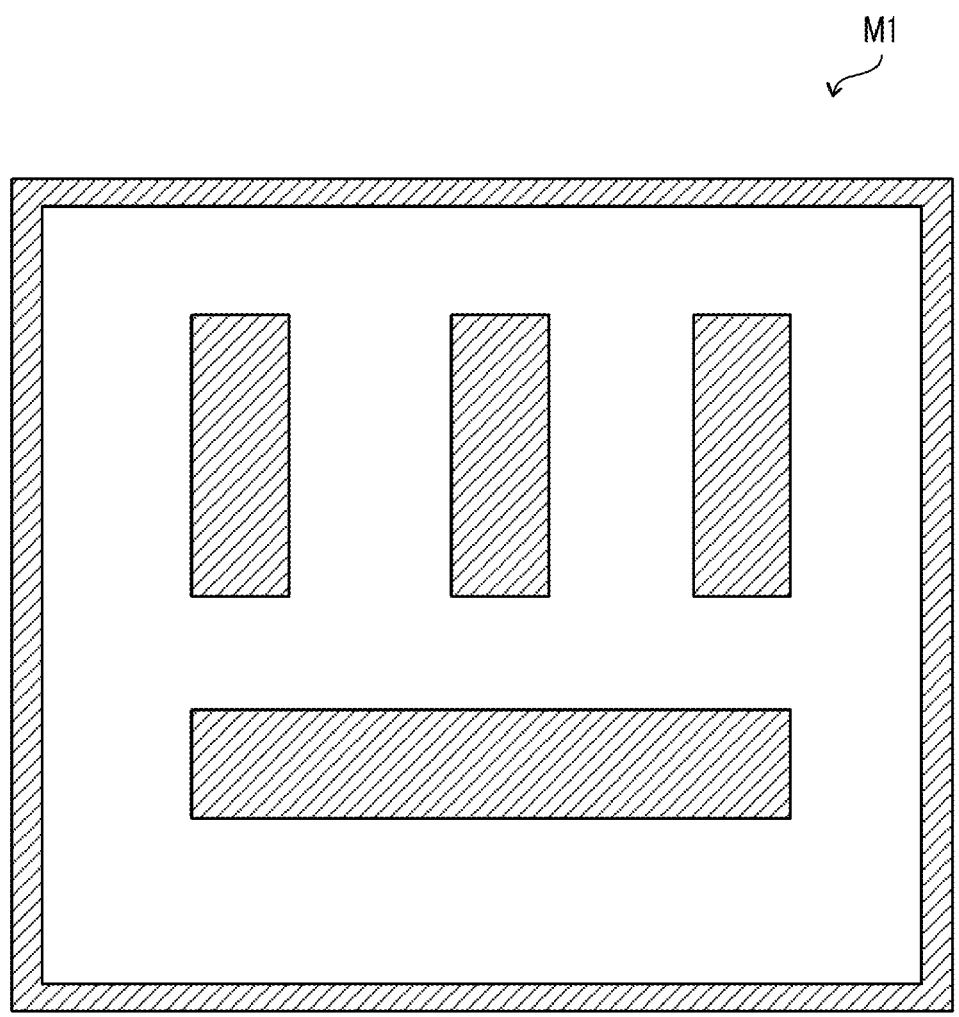
FIG. 6 is a diagram illustrating example map information registered with a storage in a cleaner according to one or more embodiments.
Figures 7, 8:
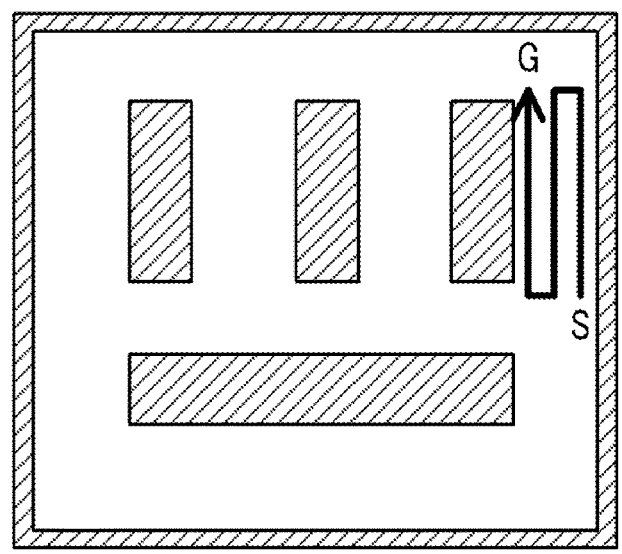
FIG. 7 is a diagram illustrating example route information registered with a storage in a cleaner according to one or more embodiments.
FIG. 8 is a diagram illustrating an example route image registered with a storage in a cleaner according to one or more embodiments.

A storage 50 (refer to FIG. 5) is a non-volatile storage, such as a hard disk drive (HDD) or a solid-state drive (SSD), that stores various items of information. More specifically, the storage 50 stores data such as map information 51 and route information 52. FIG. 6 is a diagram illustrating an example of the map information 51. FIG. 7 is a diagram illustrating an example of the route information 52.

As shown in FIG. 6, information about an environment map corresponding to a cleaning area (work area) in which the cleaner 10 travels may be registered as the map information 51. One or more environment maps may be registered as the map information 51. FIG. 6 shows a single environment map M1 in one example. To generate, for example, an environment map for each floor of a facility, multiple environment maps corresponding to the respective floors of the facility are registered as the map information 51. More specifically, an environment map M1 of a floor F1, an environment map M2 of a floor F2, and an environment map M3 of a floor F3 of the facility are registered as the map information 51. The environment maps may be generated in advance by an external device, or generated based on a distance to an obstacle and its position detected by the traveling cleaner 10 with sensors (e.g., the front laser sensor 41 and the sonar sensors 42). Thus, the control unit 40 may generate an environment map of a traveling area by causing the cleaner 10 to travel. The environment map M1 shown in FIG. 6 will now be described.

As shown in FIG. 7, information about individual traveling routes generated based on the teaching operation performed by the operator is registered as the route information 52. More specifically, information such as a route identification (ID), a route name, position information, and a route image for each individual traveling route is registered as the route information 52. The control unit 40 generates the individual traveling routes based on the teaching operation performed by the operator and registers information about the generated individual traveling routes as the route information 52. The route ID is identification information about each individual traveling route. The route name is the name of each individual traveling route. The position information indicates the position (coordinates) of the individual traveling route. For example, coordinate information about one individual traveling route from a starting point (teaching travel starting point) to a destination (teaching travel end point) is registered as the position information for the individual traveling route. The route image is image information with which the individual traveling route may be identified on the environment map M1. For example, FIG. 8 shows an example of a route image E1 for an individual traveling route R1. The route image E1 includes a starting point S and a destination G of the individual traveling route R1 and a travel path (solid arrow in the figure) connecting the starting point S and the destination G.

In some embodiments, at least one item of information such as the map information 51 and the route information 52 may be stored into a server accessible from the cleaner 10 through a network.

Figure 18:
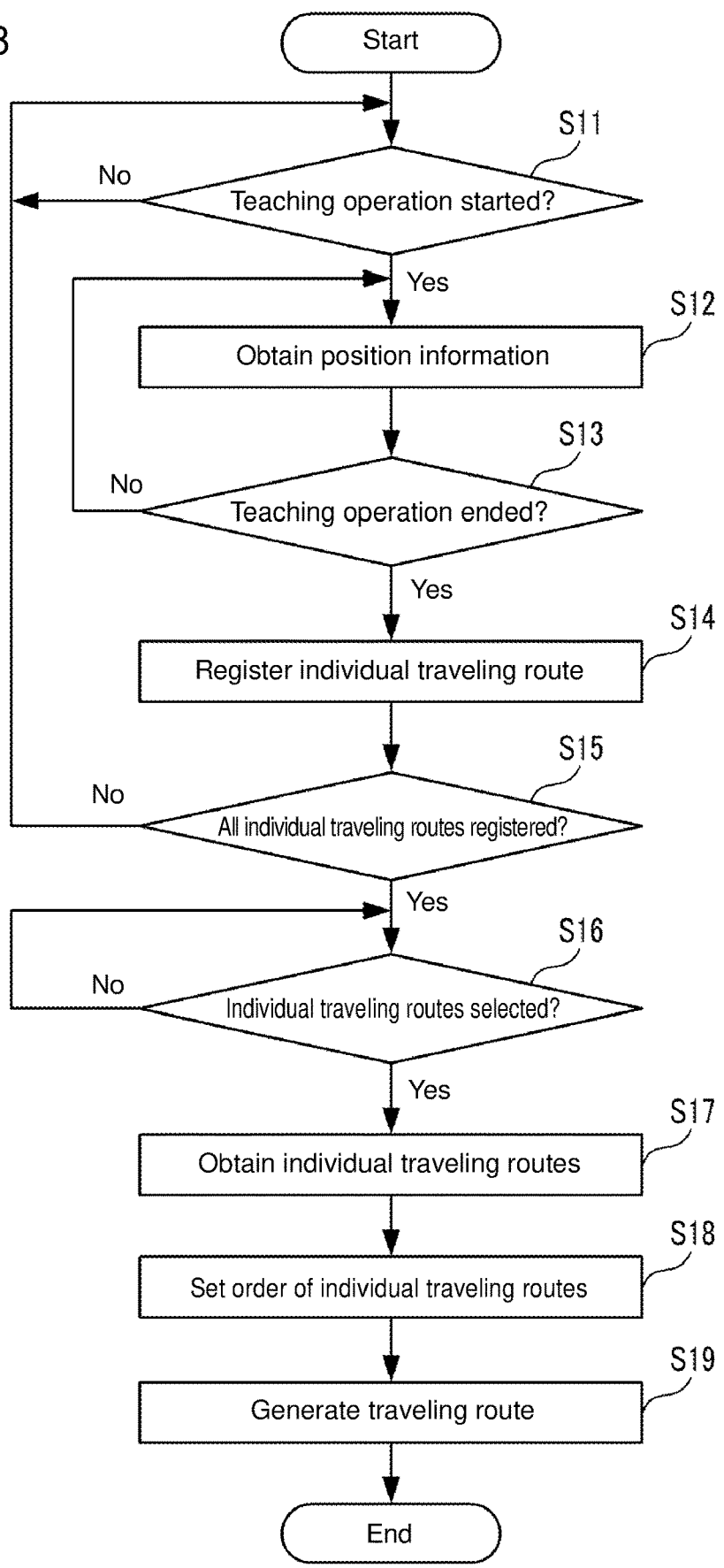
FIG. 18 is a diagram illustrating a flowchart showing an example traveling route generation process performed by a cleaner according to one or more embodiments.

The storage 50 stores a control program such as a traveling route generation program for causing the control unit 40 to perform a traveling route generation process described later (refer to FIG. 18). For example, the traveling route generation program is recorded in a non-transitory computer-readable recording medium, such as a compact disc (CD) or a digital versatile disc (DVD), and is read by a reader (not shown) included in the cleaner 10, such as a CD drive or a DVD drive, and is stored into the storage 50.

The control unit 40 is located in an upper portion of the body 11 (refer to FIG. 2). FIG. 5 is a functional block diagram illustrating the control unit 40. The control unit 40 includes, for example, a central processing unit (CPU), a read-only memory (ROM), and a random-access memory (RAM). The CPU is a processor for performing various computations. The ROM is a non-volatile storage that prestores control programs, such as a basic input-output system (BIOS) and an operating system (OS) for causing the CPU to perform various computations. The RAM is a volatile or non-volatile storage for storing various items of information, and is used as a memory area (work area) for temporarily storing various processes to be performed by the CPU. The control unit 40 causes the CPU to execute various control programs prestored in the ROM or the storage 50 to control the cleaner 10.

More specifically, as shown in FIG. 5, the control unit 40 includes various processing units such as a display unit 411, a reception unit 412, a registration unit 413, an obtaining unit 414, a setting unit 415, a generation unit 416, and a traveling unit 417. The control unit 40 causes the CPU to perform various processes in accordance with the traveling route generation program, thus serving as the various processing units. At least one of these units may include an electronic circuit. The traveling route generation program may be a program for causing multiple processors to serve as the processing units.

Figure 11:
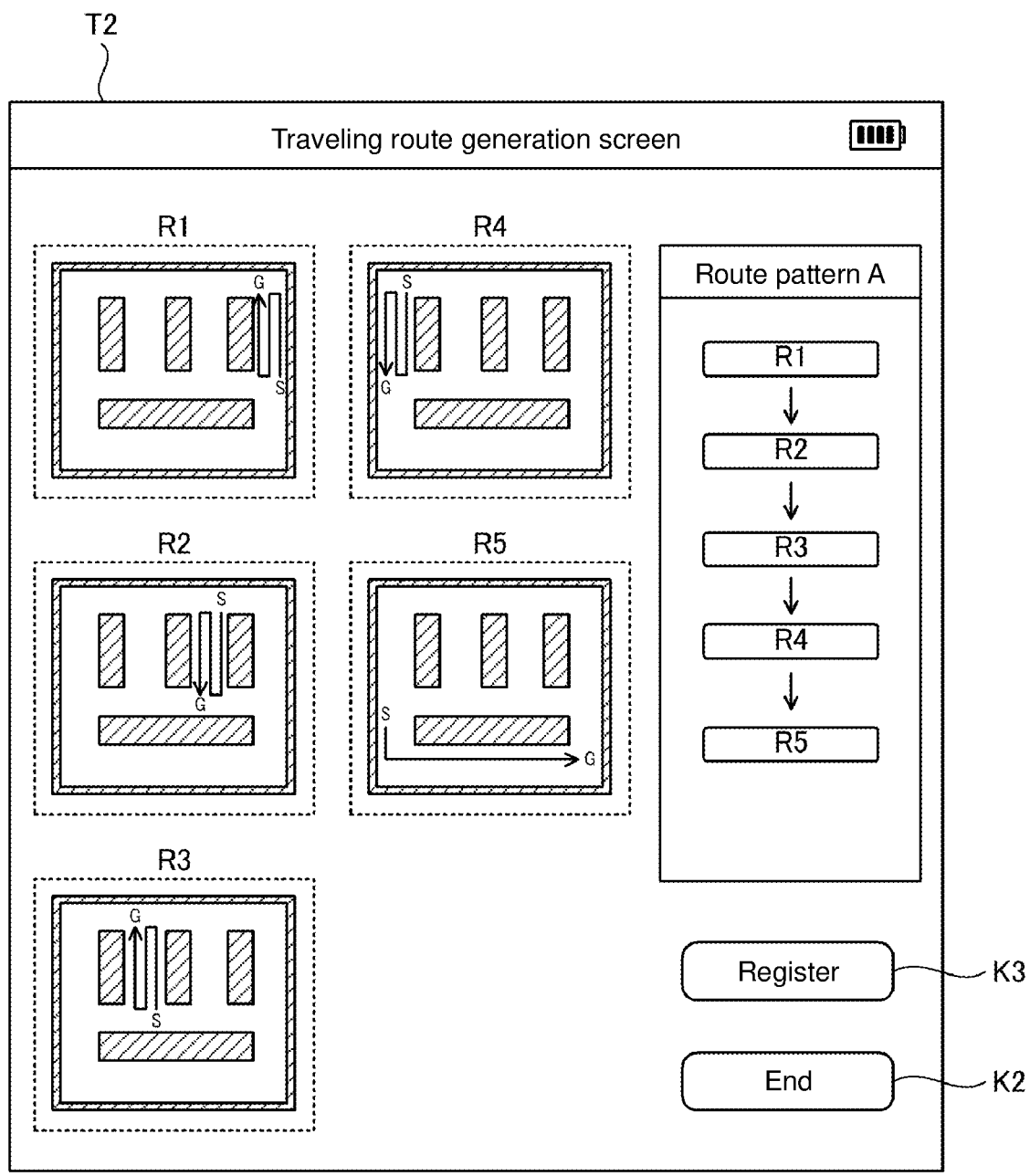
FIG. 11 is a diagram illustrating an example traveling route generation screen displayed by a cleaner according to one or more embodiments.

The display unit 411 displays various items of information on the operation unit 20 and the display panel 21. More specifically, the display unit 411 displays, on the display panel 21 during cleaning, various messages including a cleaning status message indicating cleaning currently being performed or a guidance message about a floor currently being cleaned. The display unit 411 may display, on the operation unit 20, a mode switch screen (not shown) for switching an operation mode (e.g., a normal operation mode and a teaching operation mode), a teaching operation screen T1 (refer to FIG. 9) for performing the teaching operation, a traveling route generation screen T2 (refer to FIG. 11) for generating a traveling route, and a traveling route confirmation screen T3 (refer to FIG. 14) for displaying the generated traveling route. The control unit 40 switches the operation mode to the teaching operation mode in response to, for example, an operation for switching to the teaching operation mode performed by the operator on the mode switch screen. The display unit 411 displays, for example, the teaching operation screen T1 shown in FIG. 9 on the operation unit 20.

The display unit 411 also displays, on the teaching operation screen T1, an environment map (the environment map M1 in this example) selected by the operator. The display unit 411 may be an example of a display unit in one or more embodiments.

The reception unit 412 receives operations performed by the operator. More specifically, the reception unit 412 receives the teaching operation performed by the operator. For example, the reception unit 412 receives selection of a start button K1 and an end button K2 performed by the operator on the teaching operation screen T1. In response to the operator selecting the start button K1, an individual traveling route starts being registered. In response to the operator selecting the end button K2, the registration of the individual traveling route ends. The reception unit 412 receives, for example, selection of the operation buttons (the travel button 22F, the retract button 22B, the left-turn button 22L, and the right-turn button 22R) (refer to FIG. 3) performed by the operator on the operation handle 22 (traveling operation). In response to the operator selecting (pressing) the operation button, the cleaner 10 travels in accordance with the selected operation button. The operations performed by the operator on the teaching operation screen T1 and on the operation handle 22 are examples of the teaching operation (the teaching operation in one or more embodiments.) The reception unit 412 may be an example of a reception unit in one or more embodiments.

The registration unit 413 registers, as the route information 52 in the storage 50, an individual traveling route corresponding to the teaching operation received by the reception unit 412. More specifically, the registration unit 413 registers, as the individual traveling route with the route information 52, a route traveled by the cleaner 10 during a period from when the reception unit 412 receives an instruction to start the teaching operation to when the reception unit 412 receives an instruction to end the teaching operation.

Figure 9:
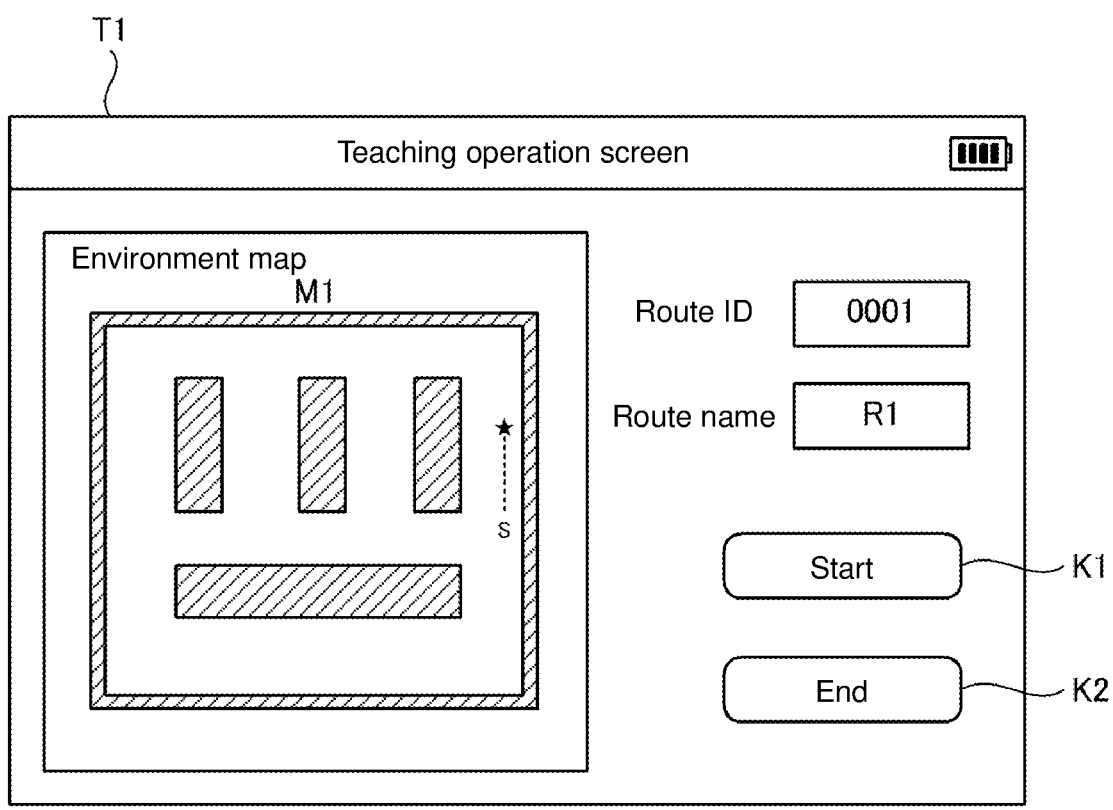
FIG. 9 is a diagram illustrating an example teaching operation screen displayed by a cleaner according to one or more embodiments.

For example, the operator moves the cleaner 10 to the starting point S in the work area corresponding to the environment map M1 and selects the start button K1 on the teaching operation screen T1 (refer to FIG. 9). The operator then operates the operation handle 22 on the cleaner 10 to allow the cleaner 10 to travel on an intended route. During traveling of the cleaner 10 based on the operation performed by the operator, the registration unit 413 obtains position information about the cleaner 10. The display unit 411 displays the moving path (indicated by the dotted lines in FIG. 9) and the current position (indicated by the black star in FIG. 9) about the cleaner 10 on the environment map M1 on the teaching operation screen T1. In response to the operator stopping the traveling of the cleaner 10 and selecting the end button K2 (refer to FIG. 9) on the teaching operation screen T1, the registration unit 413 stops obtaining the position information. The registration unit 413 then registers, as the route information 52 (refer to FIG. 7), the position information obtained during a period from when the operator selects the start button K1 to when the operator selects the end button K2 as the individual traveling route traveled by the cleaner 10 during the period. In the example shown in FIG. 9, the registration unit 413 registers a route ID of 0001, a route name of R1, position information of P1, and a route image of E1 (refer to FIG. 8) as the route information 52.

Figure 10:
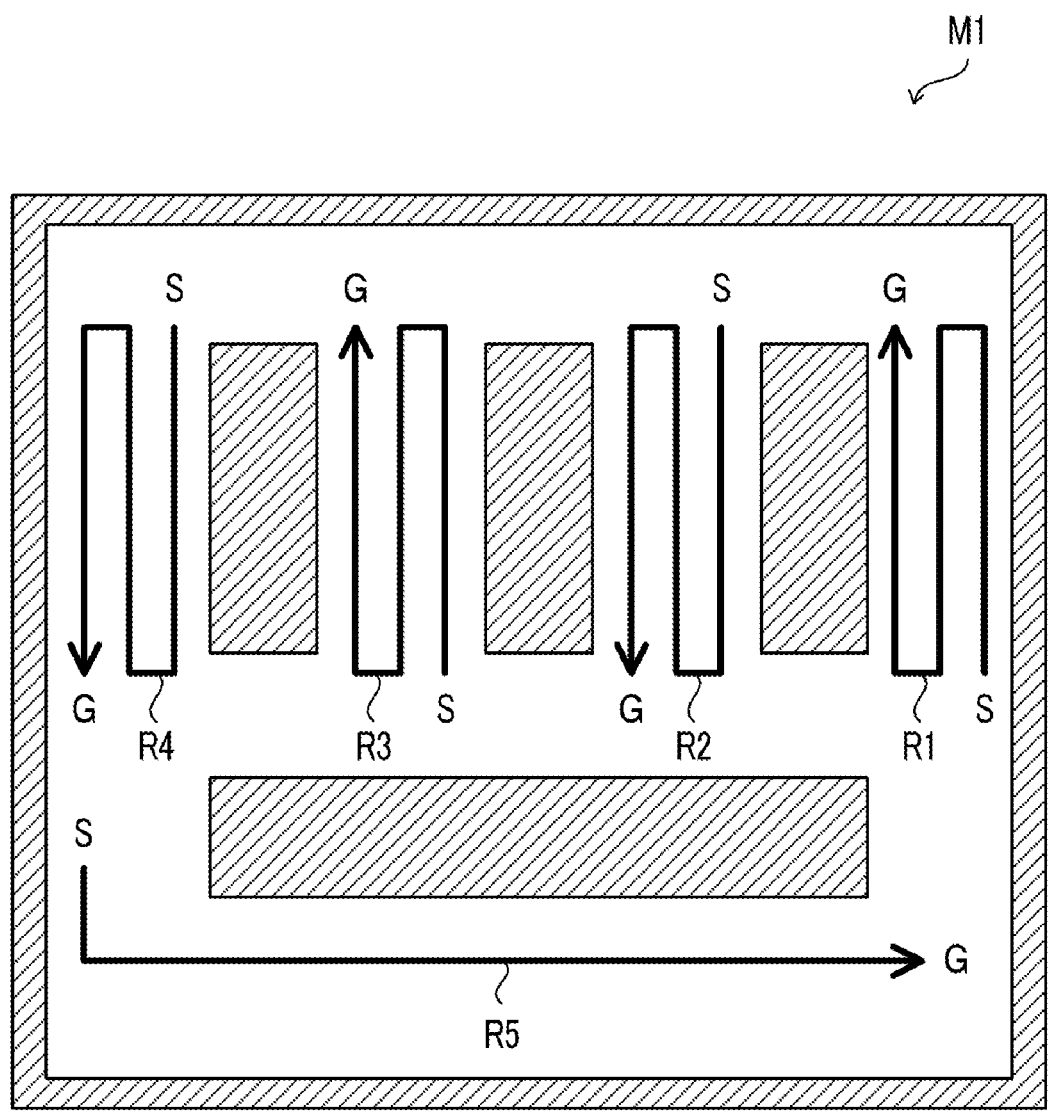
FIG. 10 is a diagram illustrating example individual traveling routes generated by a cleaner according to one or more embodiments.

The registration unit 413 registers, as the route information 52, the individual traveling route including information such as the route ID, the route name, the position information, and the route image for each teaching operation performed by the operator. FIG. 10 shows five individual traveling routes R1 to R5 corresponding to the route information 52 shown in FIG. 7. In FIG. 10, the operator has performed the teaching operation five times, and the five individual traveling routes R1 to R5 are registered with the storage 50. The registration unit 413 may be an example of a registration unit in one or more embodiments.

The obtaining unit 414 obtains one or more individual traveling routes selected by the operator from the multiple individual traveling routes registered as the route information 52 with the storage 50. More specifically, when multiple individual traveling routes are registered with the storage 50, the display unit 411 displays the traveling route generation screen T2 (refer to FIG. 11) on the operation unit 20 based on an operation performed by the operator. The display unit 411 displays route images E1 to E5 of the individual traveling routes R1 to R5 on the traveling route generation screen T2 in a selectable manner. The obtaining unit 414 obtains one or more individual traveling routes selected by the operator on the traveling route generation screen T2. In response to the operator sequentially selecting (touching) the individual traveling routes R1, R2, R3, R4, and R5 in this order on the traveling route generation screen T2, for example, the obtaining unit 414 obtains the individual traveling routes R1 to R5. The obtaining unit 414 may be an example of an obtaining unit in one or more embodiments.

The setting unit 415 sets an order of the multiple individual traveling routes obtained by the obtaining unit 414. For example, the setting unit 415 sets an order of selection in which the operator selects the multiple individual traveling routes as the order of the individual traveling routes. In the example shown in FIG. 11, the setting unit 415 sets the individual traveling routes R1, R2, R3, R4, and R5 to be the first, second, third, fourth, and fifth sequentially. The setting unit 415 sets a route pattern A to be any route name as the name of a route including the individual traveling routes R1 to R5 selected by the operator. The setting unit 415 displays, on the traveling route generation screen T2, the route pattern A, which is a route name, and information with which the order of the individual traveling routes may be identified (the order of R1, R2, R3, R4, and R5) (refer to FIG. 11). The setting unit 415 may be an example of a setting unit in one or more embodiments.

The generation unit 416 generates a traveling route to be autonomously traveled by the cleaner 10. More specifically, the generation unit 416 generates the traveling route based on the multiple individual traveling routes obtained by the obtaining unit 414 and the order of the individual traveling routes set by the setting unit 415. For example, the generation unit 416 generates the traveling route by connecting the individual traveling routes R1 to R5 obtained by the obtaining unit 414 in accordance with the order (first to fifth) set by the setting unit 415.

In response to the operator selecting a register button K3 on the traveling route generation screen T2 (refer to FIG. 11), for example, the generation unit 416 generates a single traveling route (route pattern A) connecting the starting point S of the individual traveling route R1 and the destination G of the individual traveling route R5 by connecting the destination G of the individual traveling route R1 and the starting point S of the individual traveling route R2, the destination G of the individual traveling route R2 and the starting point S of the individual traveling route R3, the destination G of the individual traveling route R3 and the starting point S of the individual traveling route R4, and the destination G of the individual traveling route R4 and the starting point S of the individual traveling route R5. The starting point and the destination of each individual traveling route may be examples of a connection point in one or more embodiments. The generation unit 416 may be an example of a generation unit in an one or more embodiments.

Figure 12:
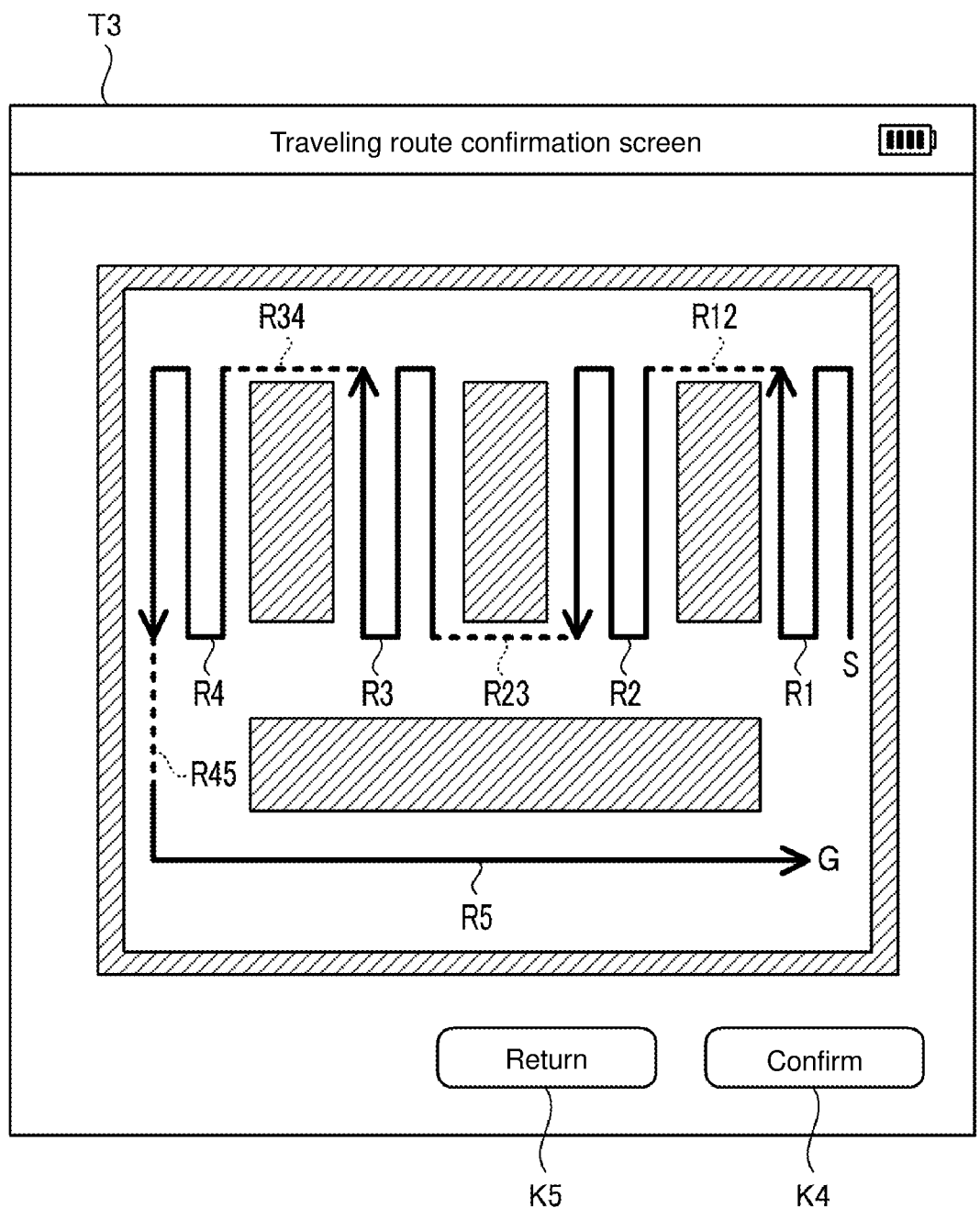
FIG. 12 is a diagram illustrating an example traveling route confirmation screen displayed by a cleaner according to one or more embodiments.

The display unit 411 displays the traveling route generated by the generation unit 416 on the traveling route confirmation screen T3 (refer to FIG. 12). In response to the operator selecting a confirm button K4 on the traveling route confirmation screen T3, the registration unit 413 registers the traveling route (route pattern A) with the storage 50. In response to the operator selecting a return button K5 on the traveling route confirmation screen T3, the screen returns to the traveling route generation screen T2 (refer to FIG. 11) to allow the operator to, for example, re-select the individual traveling routes.

When, for example, two individual traveling routes that are in the consecutive order have the same connecting position, or more specifically, the destination G of one individual traveling route and the starting point S of the other individual traveling route are at the same position (at the same coordinates), the generation unit 416 connects the two individual traveling routes at the same position.

However, when two individual traveling routes that are in the consecutive order have different connecting positions, or more specifically, the destination G of one individual traveling route and the starting point S of the other individual traveling route are distant from each other (with different coordinates), the generation unit 416 generates a supplemental route connecting the connecting positions and the traveling route with the multiple individual traveling routes and the supplemental routes. In the example shown in FIG. 10, the individual traveling routes R1 and R2, the individual traveling routes R2 and R3, the individual traveling routes R3 and R4, and the individual traveling routes R4 and R5 have different connecting positions. As shown in FIG. 12, the generation unit 416 thus generates a supplemental route R12 connecting the connecting positions of the individual traveling routes R1 and R2, a supplemental route R23 connecting the connecting positions of the individual traveling routes R2 and R3, a supplemental route R34 connecting the connecting positions of the individual traveling routes R3 and R4, and a supplemental route R45 connecting the connecting positions of the individual traveling routes R4 and R5. The generation unit 416 then generates the traveling route connecting the individual traveling route R1, the supplemental route R12, the individual traveling route R2, the supplemental route R23, the individual traveling route R3, the supplemental route R34, the individual traveling route R4, the supplemental route R45, and the individual traveling route R5.

The generation unit 416 may generate, as a supplemental route, a route connecting the connecting positions of the two individual traveling routes that are in the consecutive order with the shortest distance or time or a route minimizing the travel load between the connecting positions.

The display unit 411 may display the supplemental routes in the traveling route on the traveling route confirmation screen T3 in an identifiable manner. As shown in FIG. 12, for example, the display unit 411 displays the supplemental routes R12, R23, R34, and R45 in a manner (indicated by, for example, dotted lines) different from the manner in which the individual traveling routes R1 to R5 are displayed.

The registration unit 413 may register, with the storage 50, the traveling route including the individual traveling routes R1 to R5 or the traveling route including the individual traveling routes R1 to R5 and the supplemental routes R12, R23, R34, and R45.

The traveling unit 417 causes the cleaner 10 to travel autonomously on the traveling route generated by the generation unit 416. More specifically, the traveling unit 417 outputs a drive signal based on the traveling route to the motors 13, and drives the traveling assembly 12 to cause the cleaner 10 to travel autonomously on the traveling route. In response to the operator selecting an intended traveling route (route pattern) on a travel instruction screen (not shown), for example, the traveling unit 417 causes the cleaner 10 to travel autonomously on the traveling route. When the operator presets a traveling schedule for the traveling route, the traveling unit 417 causes the cleaner 10 to travel autonomously based on the traveling schedule.

When two individual traveling routes that are in the consecutive order set by the setting unit 415 have different connecting positions, the traveling unit 417 causes the cleaner 10 to travel autonomously on the supplemental route connecting the connecting positions based on connecting position information indicating the connecting positions and current position information and map information about the cleaner 10.

In the example shown in FIG. 10, the traveling unit 417 causes the cleaner 10 to travel autonomously to the starting point S of the individual traveling route R2 based on the current position information and the map information included in the environment map M1 after the cleaner 10 reaches the destination G of the individual traveling route R1. In this manner, the traveling unit 417 causes the cleaner 10 to travel autonomously on the individual traveling routes in the order (traveling order) set by the operator.

When the traveling route including the individual traveling routes R1 to R5 and the supplemental routes R12, R23, R34, and R45 is registered with the storage 50, the traveling unit 417 may cause the cleaner 10 to travel autonomously based on position information corresponding to the traveling route.

Figure 13:
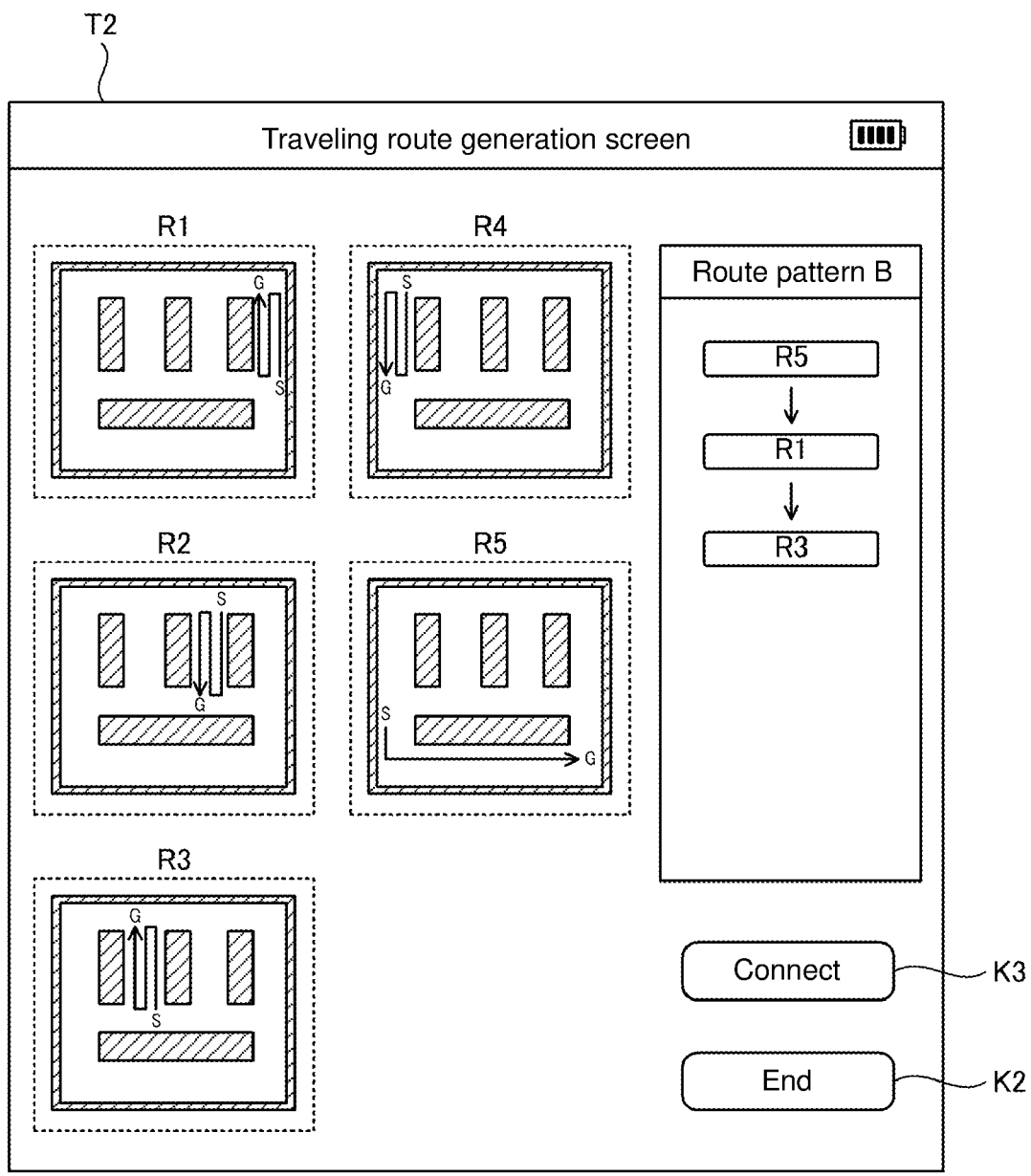
FIG. 13 is a diagram illustrating an example traveling route generation screen displayed by a cleaner according to one or more embodiments.

An example process performed by the control unit 40 in response to the operator sequentially selecting (touching) the individual traveling routes R5, R1, and R3 in this order on the traveling route generation screen T2 shown in FIG. 13 will now be described.

Figure 14:
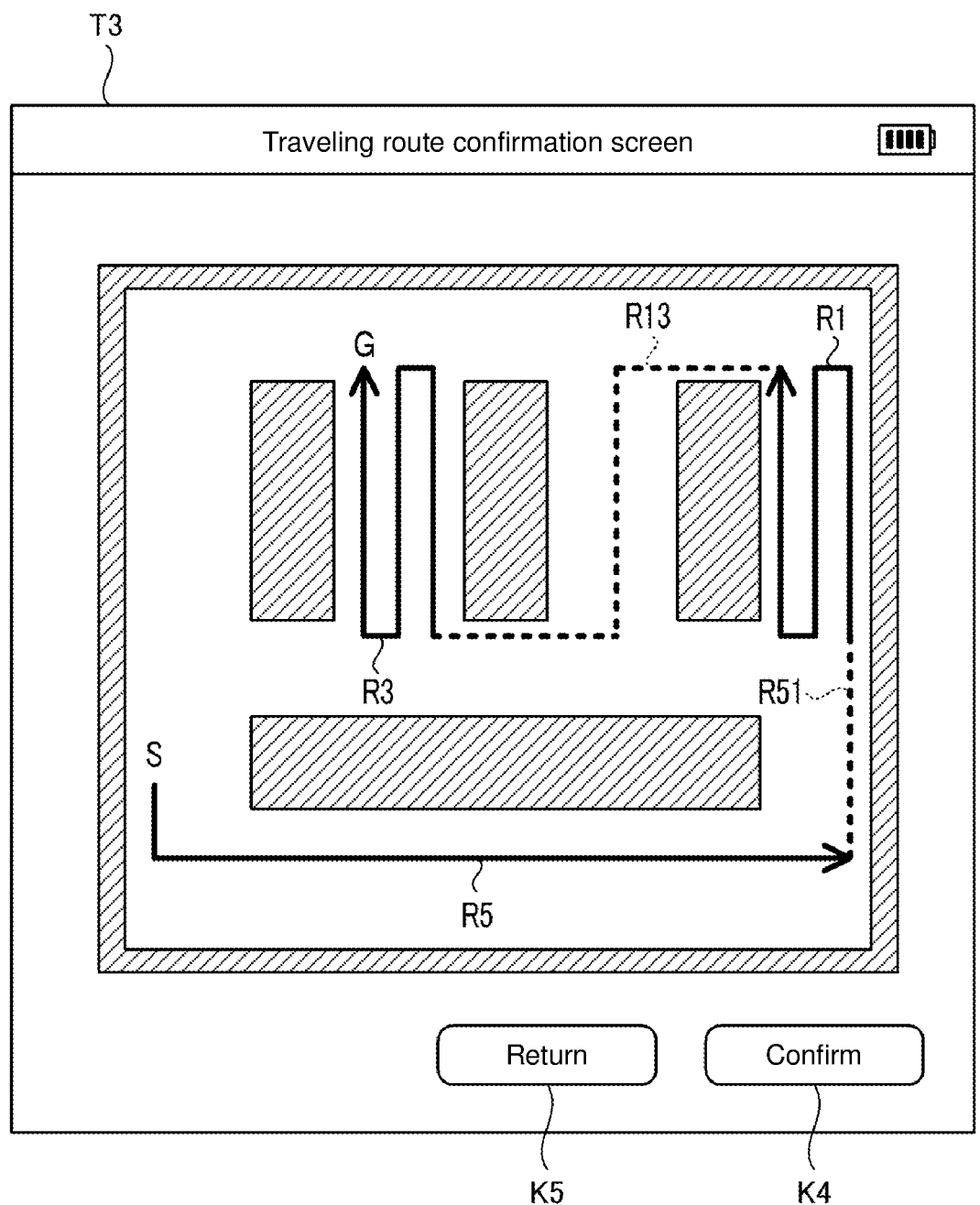
FIG. 14 is a diagram illustrating an example traveling route confirmation screen displayed by a cleaner according to one or more embodiments.

The obtaining unit 414 obtains the individual traveling routes R1, R3, and R5 selected by the operator. The setting unit 415 sets the individual traveling route R5 to be the first, the individual traveling route R1 to be the second, and the individual traveling route R3 to be the third. The setting unit 415 sets a route pattern B, which may be any route name, as the name of a route including the individual traveling routes R1, R3, and R5 selected by the operator. The setting unit 415 displays, on the traveling route generation screen T2, the route pattern B, which is a route name, and information (the order of R5, R1, and R3) with which the order of each individual traveling route may be identified. As shown in FIG. 14, the generation unit 416 generates a supplemental route R51 connecting the connecting positions of the individual traveling routes R5 and R1 and a supplemental route R13 connecting the connecting positions of the individual traveling routes R1 and R3. The generation unit 416 generates the traveling route with the individual traveling route R5, the supplemental route R51, the individual traveling route R1, the supplemental route R13, and the individual traveling route R3.

In this manner, the generation unit 416 generates a single traveling route (route pattern B) (refer to FIG. 14) connecting the starting point S of the individual traveling route R5 and the destination G of the individual traveling route R3. The traveling unit 417 causes the cleaner 10 to travel using the route pattern B. When the operator sets, on a setting screen (not shown) for a traveling schedule, a traveling schedule for starting the travel using the route pattern A on the date and time t1 and starting the travel using the route pattern B on the date and time t2, the traveling unit 417 causes the cleaner 10 to travel autonomously based on the traveling schedule.

When the traveling route (route pattern) registered with the storage 50 is to be partly changed, the control unit 40 performs the process described below. In this example, the individual traveling route R3 in the route pattern A shown in FIG. 12 is changed.

Figure 15:
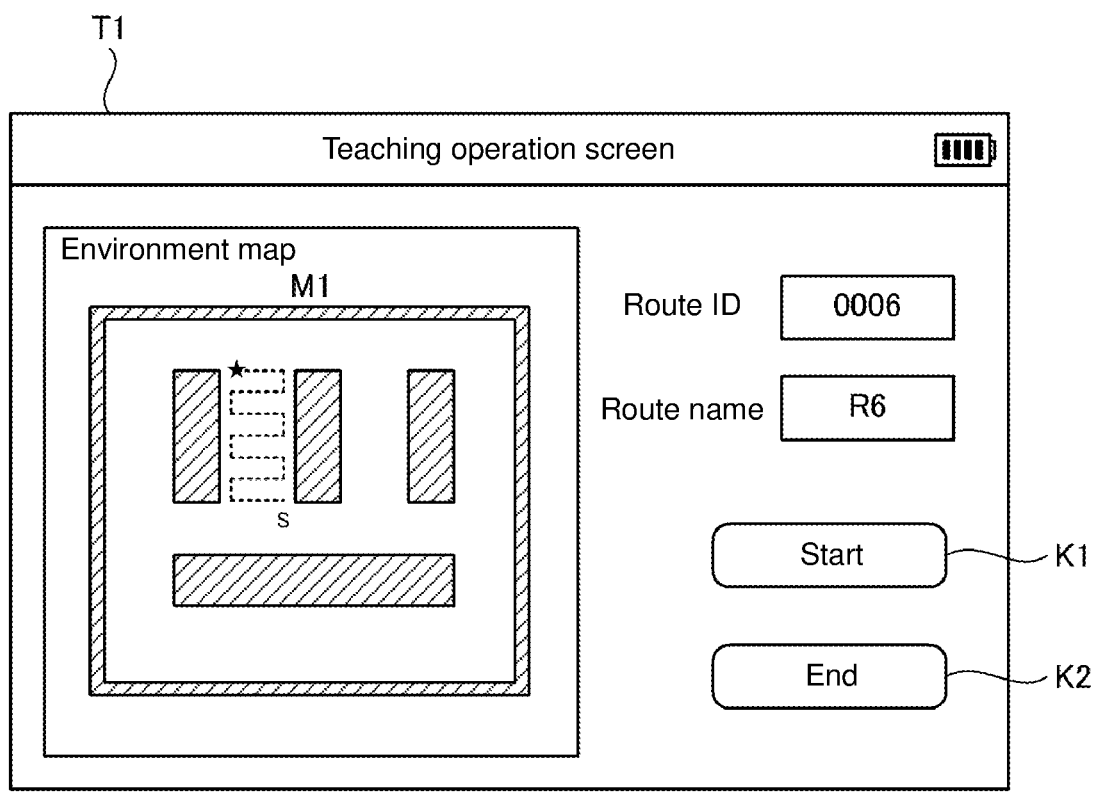
FIG. 15 is a diagram illustrating an example teaching operation screen displayed by a cleaner according to one or more embodiments.

The operator moves the cleaner 10 to the starting point S of a route to be changed in the work area and selects the start button K1 on the teaching operation screen T1 (refer to FIG. 15). The operator then operates the operation handle 22 on the cleaner 10 to cause the cleaner 10 to travel on an intended route (indicated by the dotted lines shown in FIG. 15). In response to the operator stopping the traveling of the cleaner 10 and selecting the end button K2 on the teaching operation screen T1, the registration unit 413 registers, as the route information 52 (refer to FIG. 7), the position information obtained during a period from when the operator selects the start button K1 to when the operator selects the end button K2 as the individual traveling route traveled by the cleaner 10 during the period. In the example shown in FIG. 15, the registration unit 413 registers, as the route information 52, an individual traveling route with the route ID of 0006 and the route name of R6. Thus, an individual traveling route R6 is added to the traveling route generation screen T2 (refer to FIG. 16).

Figure 16:
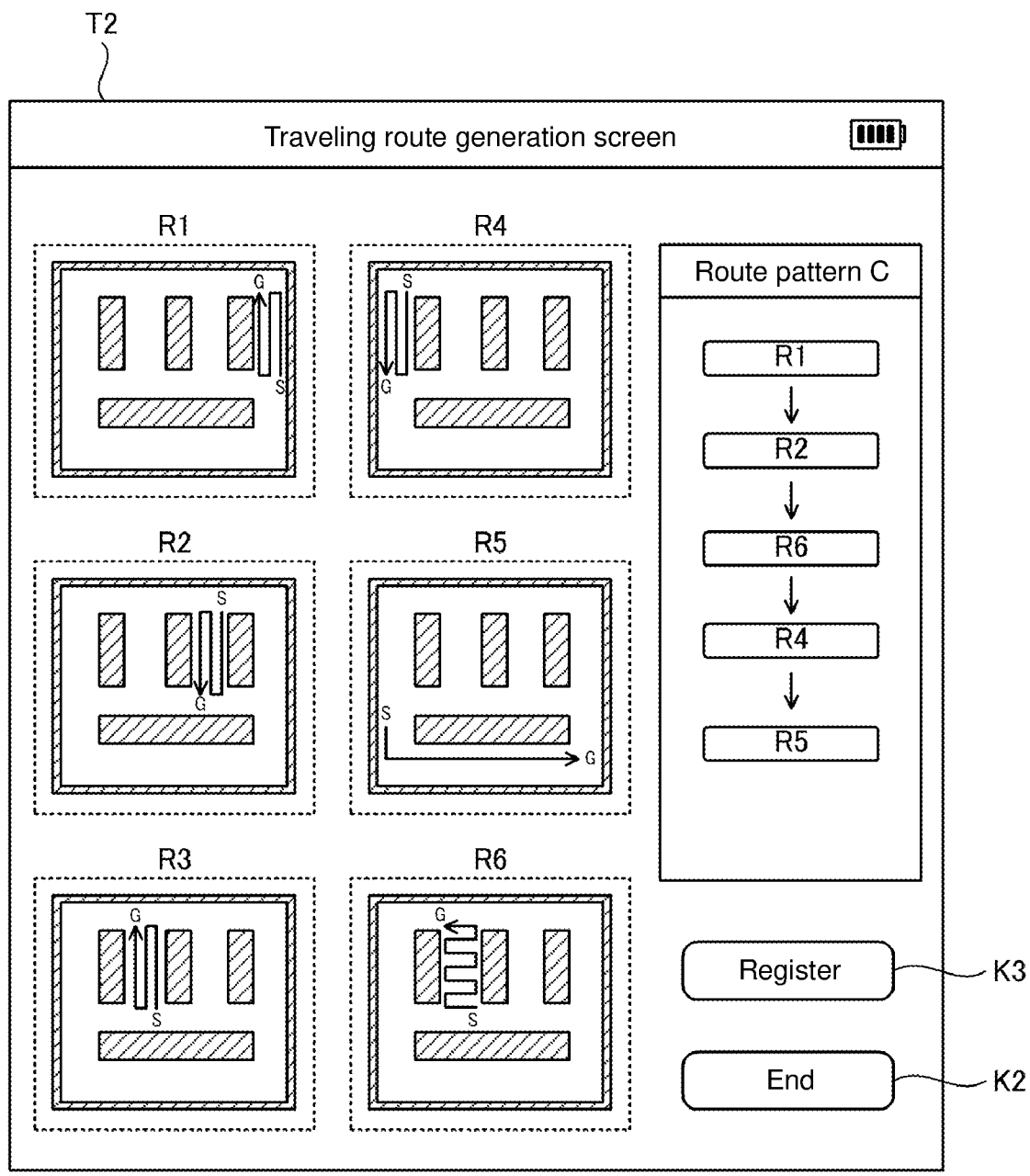
FIG. 16 is a diagram illustrating an example traveling route generation screen displayed by a cleaner according to one or more embodiments.
Figure 17:
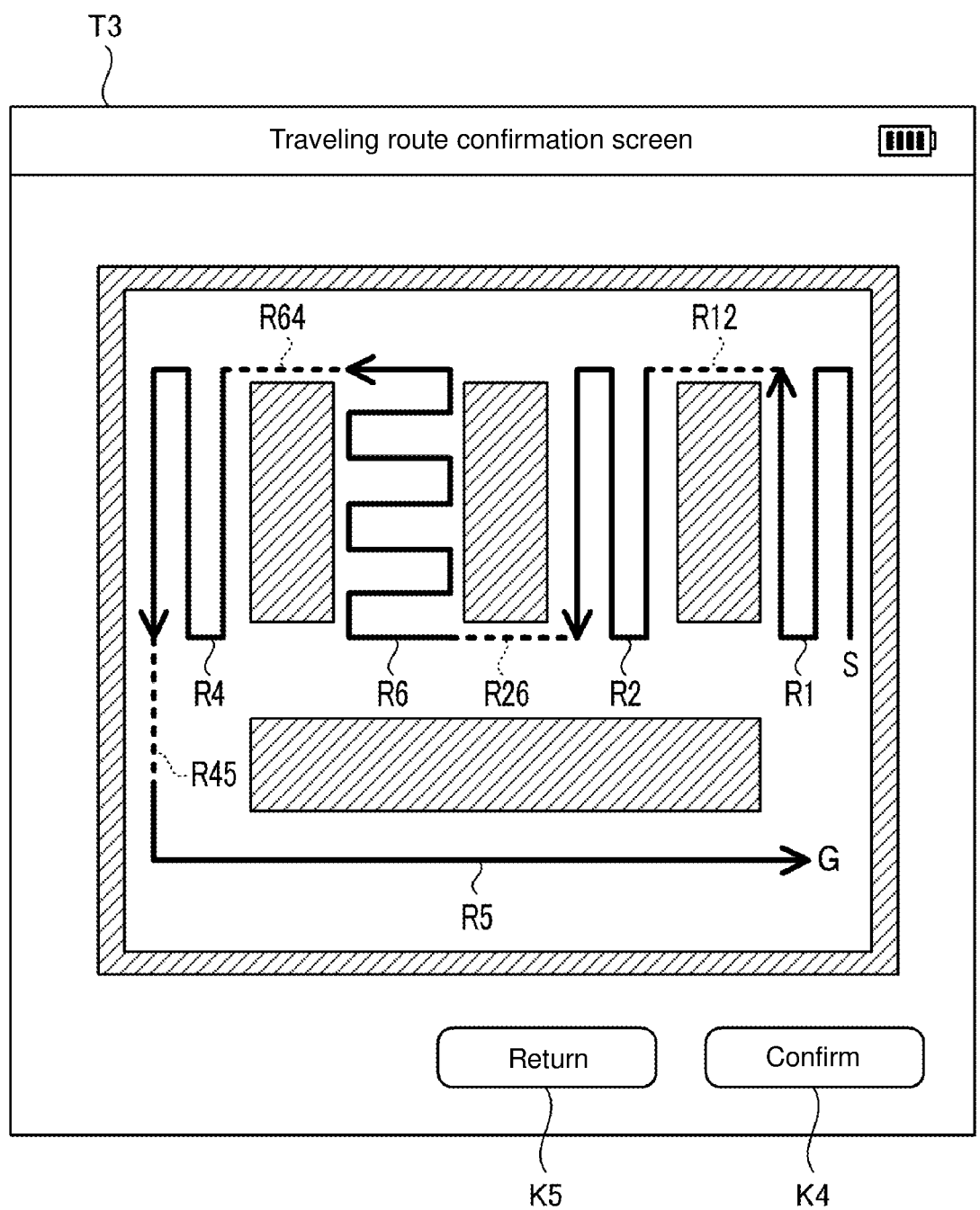
FIG. 17 is a diagram illustrating an example traveling route confirmation screen displayed by a cleaner according to one or more embodiments.

In response to the operator sequentially selecting (touching) the individual traveling routes R1, R2, R6, R4, and R5 in this order on the traveling route generation screen T2, the obtaining unit 414 obtains the individual traveling routes, and the setting unit 415 sets the individual traveling route R1 to be the first, the individual traveling route R2 to be the second, the individual traveling route R6 to be the third, the individual traveling route R4 to be the fourth, and the individual traveling route R5 to be the fifth (refer to FIG. 16). As shown in FIG. 17, the generation unit 416 generates the supplemental route R12 connecting the connecting positions of the individual traveling routes R1 and R2, a supplemental route R26 connecting the connecting positions of the individual traveling routes R2 and R6, a supplemental route R64 connecting the connecting positions of the individual traveling routes R6 and R4, and the supplemental route R45 connecting the connecting positions of the individual traveling routes R4 and R5. The generation unit 416 generates the traveling route (route pattern C) connecting the individual traveling route R1, the supplemental route R12, the individual traveling route R2, the supplemental route R26, the individual traveling route R6, the supplemental route R64, the individual traveling route R4, the supplemental route R45, and the individual traveling route R5.

The generation unit 416 thus generates the new route pattern C by replacing the individual traveling route R3 in the route pattern A shown in FIG. 12 with the individual traveling route R6. The control unit 40 may register the individual traveling route R3 with the storage 50 by updating (overwriting) the individual traveling route R6 using the individual traveling route R3. In this case, the route pattern A is updated to a new route.

The control unit 40 also controls, for example, the driving of the suction fans 151 in the suction unit 15 and the returning to the charging station (not shown).

Traveling Route Generation Process

A traveling route generation process performed by the cleaner 10 will be described with reference to FIG. 18. More specifically, the control unit 40 in the cleaner 10 performs the traveling route generation process in one or more embodiments.

A traveling route generation method according to one or more embodiments for performing one or more steps included in the traveling route generation process. One or more steps included in the traveling route generation process described below may be eliminated as appropriate. The steps in the traveling route generation process may be performed in a different order to produce the same advantageous effects. Although the control unit 40 performs the steps in the traveling route generation process in this example, a traveling route generation method according to another embodiment or embodiments may allow multiple processors to separately perform the steps in the traveling route generation process.

The control unit 40 first determines whether it has received an instruction to start the teaching operation performed by the operator in step S11. More specifically, the control unit 40 determines whether it has received selection of the start button K1 performed by the operator on the teaching operation screen T1 (refer to FIG. 9) after switching the operation mode to the teaching operation mode. In response to the instruction to start the teaching operation (Yes in S11), the processing advances to step S12. The processing waits in step S11 (No in S11) until reception of the instruction to start the teaching operation. The processing in step S11 is performed by the reception unit 412 in the control unit 40. Step S11 may be an example of a reception step in one or more embodiments.

In step S12, the control unit 40 obtains the position information about the current position of the cleaner 10. For example, during manual driving of the cleaner 10 with the operator operating the operation buttons (the travel button 22F, the retract button 22B, the left-turn button 22L, and the right-turn button 22R) (refer to FIG. 3) on the operation handle 22 (performing a traveling operation), the control unit 40 obtains the position information about the cleaner 10 sequentially.

In step S13, the control unit 40 determines whether it has received an instruction to end the teaching operation performed by the operator. More specifically, the control unit 40 determines whether it has received selection of the end button K2 performed by the operator on the teaching operation screen T1 (refer to FIG. 9). In response to the instruction to end the teaching operation (Yes in S13), the processing advances to step S14. Until reception of the instruction to end the teaching operation, the control unit 40 then repeats the processing in steps S12 and S13 (No in S13).

In step S14, the control unit 40 registers, as the route information 52, the individual traveling route corresponding to the teaching operation with the storage 50. More specifically, the control unit 40 registers, as the route information 52 (refer to FIG. 7), an individual traveling route traveled by the cleaner 10 during a period from when receiving the instruction to start the teaching operation to when receiving the instruction to end the teaching operation. The processing in steps S12 to S14 is performed by the registration unit 413 in the control unit 40. Steps S12 to S1 may be examples of a registration step in one or more embodiments.

In step S15, the control unit 40 determines whether the registration is complete for all the individual traveling routes. When, for example, the teaching operation is complete for all the traveling routes intended by the operator on the work area corresponding to the environment map M1 shown in FIG. 11 (Yes in S15), the processing advances to step S16. When the teaching operation is incomplete (No in S15), the processing returns to step S11. The multiple individual traveling routes are registered with the storage 50 by repeating the processing in steps S11 to S14.

The above processing in steps S11 to S15 corresponds to a teaching process. The control unit 40 performs the processing in steps S16 to S19 (traveling route generation process) after the teaching process ends. The teaching process and the traveling route generation process may not be performed consecutively (continuously).

In step S16, the control unit 40 determines whether it has received selection of the individual traveling routes performed by the operator. More specifically, the control unit 40 determines whether it has received the selection of the individual traveling routes performed by the operator on the traveling route generation screen T2 (refer to FIG. 11). In response to the selection of the individual traveling routes (Yes in S16), the processing advances to step S17. Until reception of the selection of the individual traveling routes, the control unit 40 repeats the processing in step S16 (No in S16). When, for example, the operator sequentially selects the individual traveling routes R1 to R5 in this order on the traveling route generation screen T2, the processing advances to step S17.

In step S17, the control unit 40 obtains the multiple individual traveling routes selected by the operator. In this example, the control unit 40 obtains the individual traveling routes R1 to R5. The processing in step S17 is performed by the obtaining unit 414 in the control unit 40. Step S17 may be an example of an obtaining step in one or more embodiments.

In step S18, the control unit 40 sets the order of the obtained multiple individual traveling routes. In the example shown in FIG. 11, the control unit 40 sets the individual traveling route R1 to be the first, the individual traveling route R2 to be the second, the individual traveling route R3 to be the third, the individual traveling route R4 to be the fourth, and the individual traveling route R5 to be the fifth. The processing in step S18 is performed by the setting unit 415 in the control unit 40. Step S18 may be an example of a setting step in one or more embodiments.

In step S19, the control unit 40 generates a traveling route traveled by the cleaner 10 based on the obtained multiple individual traveling routes and the set order of the individual traveling routes. For example, the control unit 40 generates the traveling route by connecting the individual traveling routes R1 to R5 in the set order (first to fifth).

When two individual traveling routes that are in the consecutive order have different connecting positions, or more specifically, the destination G of one individual traveling route and the starting point S of the other individual traveling route are distant from each other (at different coordinates), the control unit 40 generates a supplemental route connecting the connecting positions and the traveling route with the multiple individual traveling routes and the supplemental routes. As shown in FIG. 12, for example, the control unit 40 generates the supplemental route R12 connecting the connecting positions of the individual traveling routes R1 and R2, the supplemental route R23 connecting the connecting positions of the individual traveling routes R2 and R3, the supplemental route R34 connecting the connecting positions of the individual traveling routes R3 and R4, and the supplemental route R45 connecting the connecting positions of the individual traveling routes R4 and R5. The control unit 40 generates the traveling route with the individual traveling route R1, the supplemental route R12, the individual traveling route R2, the supplemental route R23, the individual traveling route R3, the supplemental route R34, the individual traveling route R4, the supplemental route R45, and the individual traveling route R5. The processing in step S19 is performed by the generation unit 416 in the control unit 40. Step S19 may be an example of a generation step in one or more embodiments.

The traveling route (route pattern) generated in this manner is registered with the storage 50. The operator selects an intended traveling route from one or more traveling routes (route patterns) registered with the storage 50 when causing the cleaner 10 to travel autonomously. The control unit 40 causes the cleaner 10 to travel autonomously on the traveling route selected by the operator.

As described above, the cleaner 10 according to one or more embodiments receives a teaching operation performed by the operator to cause a teaching travel of the cleaner 10, and registers, with the storage 50, the individual traveling route corresponding to the teaching operation. The cleaner 10 obtains the multiple individual traveling routes selected by the operator from the multiple individual traveling routes registered with the storage 50, and sets the order of the obtained multiple individual traveling routes. The cleaner 10 generates a traveling route autonomously traveled by the cleaner 10 based on the multiple individual traveling routes and the order.

This structure allows the traveling route in a work area to be divided into multiple individual traveling routes and registered with the storage 50. Thus, an intended traveling route may be generated easily by connecting multiple individual traveling routes selected by the operator. To partly change the generated traveling route, an individual traveling route corresponding to a part to be changed is replaced with a newly generated individual traveling route. The generated traveling route may be changed partly, without generating an entirely new traveling route. This structure improves the work efficiency of the operator for generating the traveling route of the cleaner 10.

In the above described embodiment or embodiments, although the cleaner 10 alone corresponds to the autonomous traveling system, the autonomous traveling system according to one or more embodiments may include one or more components included in the cleaner 10 and a server (information processing device). When, for example, multiple components in the cleaner 10 and the server cooperate with one another to implement the traveling route generation process (refer to FIG. 18) in a shared manner, a system including the multiple components that implement the process may be the autonomous traveling system according to one or more embodiments. For example, the server alone may function as the autonomous traveling system according to one or more embodiments. More specifically, the server may include the processing units (the display unit 411, the reception unit 412, the registration unit 413, the obtaining unit 414, the setting unit 415, the generation unit 416, and the traveling unit 417) in the control unit 40 shown in FIG. 5 and control the cleaner 10.

The invention claimed is:

1. An autonomous traveling system for causing an autonomous traveling device to travel based on a traveling route, the system comprising a processor configured with a program to perform operations comprising:
   operation as a reception unit that receives a teaching operation performed by an operator to cause a teaching travel of the autonomous traveling device on an individual traveling route;
   operation as a registration unit that registers, with a storage, a first plurality of individual traveling routes corresponding to teaching operations received by operation as the reception unit, each individual traveling route registered with the storage comprising a starting point and a destination corresponding to positions in a work area in which the traveling route is to be established;
   operation as an obtaining unit that obtains, from the first plurality of individual traveling routes registered with the storage, a second plurality of individual traveling routes selected by the operator;
   operation as a setting unit that sets an order of the second plurality of individual traveling routes based on the operator selection of the second plurality of individual traveling routes obtained by operation as the obtaining unit;
   operation as a generation unit that generates the traveling route based on the second plurality of individual traveling routes obtained by operation as the obtaining unit and the order of the second plurality of individual traveling routes set by operation as the setting unit by connecting the second plurality of individual traveling routes according to the set order such that a starting point of a first individual traveling route in the set order is registered as a starting point of the traveling route and a destination point of a final individual traveling route in the set order is registered as the destination of the traveling route, and any individual traveling routes between the first and the final traveling routes are connected such that a starting point of a subsequent individual traveling route in the set order is connected to the destination of the previous individual traveling route in the set order; and
   operation as a traveling unit configured to cause the autonomous traveling device to travel based on the traveling route generated by operation as the generation unit.

2. The autonomous traveling system according to claim 1, wherein the processor is configured with the program to perform operations such that operation as the registration unit comprises registering, as the individual traveling route with the storage, a route on which the autonomous traveling device travels during a period from when the reception unit receives an instruction to start the teaching operation to when the reception unit receives an instruction to end the teaching operation.

3. The autonomous traveling system according to claim 2, wherein the processor is configured with the program to perform operations such that:
   operation as the reception unit comprises receiving a plurality of teaching operations performed by an operator to cause a teaching travel of the autonomous traveling device for each of the first plurality of individual traveling routes; and
   operation as the registration unit comprises registering, with the storage, each individual traveling route of the first plurality of individual traveling routes for each respective teaching operation of the plurality of teaching operations.

4. The autonomous traveling system according to claim 2, wherein the processor is configured with the program to perform operations:
   further comprising operation as a display unit that displays, on a display, the first plurality of individual traveling routes registered with the storage,
   such that operation as the obtaining unit comprises obtaining the second plurality of individual traveling routes selected by the operator from the first plurality of individual traveling routes displayed on the display.

5. The autonomous traveling system according to claim 2, wherein the processor is configured with the program to perform operations such that operation as the setting unit comprises setting an order of selection in which the operator selects the second plurality of individual traveling routes, as the order of the second plurality of individual traveling routes.

6. The autonomous traveling system according to claim 2, wherein the processor is configured with the program to perform operations such that operation as the generation unit comprises generating the traveling route by connecting the second plurality of individual traveling routes obtained by operation as the obtaining unit in the order set by operation as the setting unit.

7. The autonomous traveling system according to claim 2, wherein the processor is configured with the program to perform operations such that, in response to two of the individual traveling routes of the second plurality of traveling routes, being in a consecutive order and having different connecting positions, operation as the generation unit comprises: generating a supplemental route connecting the connecting positions; and generating the traveling route with the second plurality of individual traveling routes and the supplemental route.

8. The autonomous traveling system according to claim 7, wherein the processor is configured with the program to perform operations:
further comprising operation as a display unit that displays, on a display, the traveling route generated by operation as the generation unit, and
such that the display unit displays the supplemental route in the traveling route on the display in an identifiable manner.

9. The autonomous traveling system according to claim 2, wherein the processor is configured with the program to perform operations such that operation as the registration unit comprises registering, with the storage, the traveling route generated by operation as the generation unit.

10. The autonomous traveling system according to claim 2, wherein the processor is configured with the program to perform operations such that,
in response to two of the individual traveling routes of the second plurality of traveling routes, being in a consecutive order and having different connecting positions, operation as the traveling unit comprises causing the autonomous traveling device to travel on a supplemental route connecting the connecting positions based on connecting position information indicating the connecting positions and current position information and map information about the autonomous traveling device.

11. The autonomous traveling system according to claim 1, wherein the processor is configured with the program to perform operations such that:
operation as the reception unit comprises receiving a plurality of teaching operations performed by an operator to cause a teaching travel of the autonomous traveling device for each of the first plurality of individual traveling routes; and
operation as the registration unit comprises registering, with the storage, each individual traveling route of the first plurality of individual traveling routes for each respective teaching operation of the plurality of teaching operations.

12. The autonomous traveling system according to claim 1, wherein the processor is configured with the program to perform operations:
further comprising operation as a display unit that displays, on a display, the first plurality of individual traveling routes registered with the storage, and
such that operation as the obtaining unit comprises obtaining the second plurality of individual traveling routes selected by the operator from the first plurality of individual traveling routes displayed on the display.

13. The autonomous traveling system according to claim 1, wherein the processor is configured with the program to perform operations such that operation as the setting unit comprises setting an order of selection in which the operator selects the second plurality of individual traveling routes, as the order of the second plurality of individual traveling routes.

14. The autonomous traveling system according to claim 1, wherein the processor is configured with the program to perform operations such that operation as the generation unit comprises generating the traveling route by connecting the second plurality of individual traveling routes obtained by operation as the obtaining unit in the order set by operation as the setting unit.

15. The autonomous traveling system according to claim 1, wherein the processor is configured with the program to perform operations such that, in response to two of the individual traveling routes of the second plurality of traveling routes, being in a consecutive order and having different connecting positions, operation as the generation unit comprises: generating a supplemental route connecting the connecting positions; and generating the traveling route with the second plurality of individual traveling routes and the supplemental route.

16. The autonomous traveling system according to claim 15, wherein the processor is configured with the program to perform operations:
further comprising operation as a display unit that displays, on a display, the traveling route generated by operation as the generation unit; and
such that operation as the display unit comprises displaying the supplemental route in the traveling route on the display in an identifiable manner.

17. The autonomous traveling system according to claim 1, wherein the processor is configured with the program to perform operations such that operation as the registration unit comprises registering, with the storage, the traveling route generated by operation as the generation unit.

18. The autonomous traveling system according to claim 1 wherein the processor is configured with the program to perform operations such that,
in response to two of the individual traveling routes of the second plurality of traveling routes, being in a consecutive order and having different connecting positions, operation as the traveling unit comprises causing the autonomous traveling device to travel on a supplemental route connecting the connecting positions based on connecting position information indicating the connecting positions and current position information and map information about the autonomous traveling device.

19. An autonomous traveling method for causing an autonomous traveling device to travel based on a traveling route, the method being implementable by one or more processors, the method comprising:
receiving a teaching operation performed by an operator to cause a teaching travel of the autonomous traveling device on an individual traveling route;
registering, with a storage, a first plurality of individual traveling routes corresponding to received teaching operations, each individual traveling route registered with the storage comprising a starting point and a destination corresponding to positions in a work area in which the traveling route is to be established;
obtaining, from the first plurality of individual traveling routes registered with the storage, a second plurality of individual traveling routes selected by the operator;
setting an order of the obtained second plurality of individual traveling routes based on the operator selection of the second plurality of individual traveling routes;
generating the traveling route based on the obtained second plurality of individual traveling routes and the set order of the second plurality of individual traveling routes by connecting the second plurality of individual traveling routes according to the set order such that a starting point of a first individual traveling route in the set order is registered as a starting point of the traveling route and a destination point of a final individual traveling route in the set order is registered as the destination of the traveling route, and any individual traveling routes between the first and the final traveling routes are connected such that a starting point of a subsequent individual traveling route in the set order is connected to the destination of the previous individual traveling route in the set order; and causing the autonomous traveling device to travel based on the generated traveling route.

20. A non-transitory computer-readable storage medium storing a program for autonomous traveling for causing an autonomous traveling device to travel based on a traveling route, which when read and executed, causes one or more processors to perform operations comprising:

receiving a teaching operation performed by an operator to cause a teaching travel of the autonomous traveling device on an individual traveling route;

registering, with a storage, a first plurality of individual traveling routes corresponding to received teaching operations, each individual traveling route registered with the storage comprising a starting point and a destination corresponding to positions in a work area in which the traveling route is to be established;

obtaining, from the first plurality of individual traveling routes registered with the storage, a second plurality of individual traveling routes selected by the operator;

setting an order of the obtained second plurality of individual traveling routes based on the operator selection of the second plurality of individual traveling routes;

generating the traveling route based on the obtained second plurality of individual traveling routes and the set order of the second plurality of individual traveling routes by connecting the second plurality of individual traveling routes according to the set order such that a starting point of a first individual traveling route in the set order is registered as a starting point of the traveling route and a destination point of a final individual traveling route in the set order is registered as the destination of the traveling route, and any individual traveling routes between the first and the final traveling routes are connected such that a starting point of a subsequent individual traveling route in the set order is connected to the destination of the previous individual traveling route in the set order; and causing the autonomous traveling device to travel based on the generated traveling route.

\* \* \* \* \*